United States Patent
Terao et al.

(10) Patent No.: US 9,997,188 B2
(45) Date of Patent: Jun. 12, 2018

(54) INFORMATION PROCESSING DEVICE, INFORMATION RECORDING MEDIUM, INFORMATION PROCESSING METHOD, AND PROGRAM

(71) Applicant: SONY CORPORATION, Tokyo (JP)

(72) Inventors: Motohiro Terao, Tokyo (JP); Takashi Nagatomo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/536,845

(22) PCT Filed: Mar. 2, 2016

(86) PCT No.: PCT/JP2016/056350
§ 371 (c)(1),
(2) Date: Jun. 16, 2017

(87) PCT Pub. No.: WO2016/152412
PCT Pub. Date: Sep. 29, 2016

(65) Prior Publication Data
US 2017/0345454 A1    Nov. 30, 2017

(30) Foreign Application Priority Data
Mar. 23, 2015    (JP) ................................. 2015-059082

(51) Int. Cl.
*G11B 7/00*    (2006.01)
*G11B 7/007*    (2006.01)
*G11B 20/18*    (2006.01)

(52) U.S. Cl.
CPC .......... *G11B 7/00718* (2013.01); *G11B 20/18* (2013.01)

(58) Field of Classification Search
None
See application file for complete search history.

(56) References Cited

U.S. PATENT DOCUMENTS

| 6,075,762 A * | 6/2000 | Watanabe | G11B 7/00375 369/121 |
| 2002/0067673 A1* | 6/2002 | Ko | G11B 19/122 369/53.21 |

(Continued)

FOREIGN PATENT DOCUMENTS

| JP | 2004-133975 | 4/2004 |
| JP | 2006-302365 | 11/2006 |

(Continued)

*Primary Examiner* — Peter Vincent Agustin
(74) *Attorney, Agent, or Firm* — Paratus Law Group, PLLC

(57) ABSTRACT

A configuration for preventing a recording error when a data recording process is performed on both lands and grooves of an optical disc is realized. An information processing device includes a data processing unit configured to control a data recording process on both lands and grooves of an optical disc. The data processing unit performs a process of detecting or matching positions at which data recording states of grooves or lands on both sides adjacent to a data recording target land or groove match when data are recorded on the lands or the grooves. The data processing unit performs, for example, a dummy data recording process or a skipping process as the process of matching the data recording states of the grooves or the lands on both sides adjacent to the data recording target land or groove.

13 Claims, 28 Drawing Sheets

(56) References Cited

U.S. PATENT DOCUMENTS

| | | | | |
|---|---|---|---|---|
| 2003/0035644 A1* | 2/2003 | Nakano | ............... | G11B 27/107 386/351 |
| 2003/0227847 A1* | 12/2003 | Minabe | ............... | G11B 7/0045 369/53.27 |
| 2004/0184377 A1* | 9/2004 | Ishitobi | .............. | G11B 7/00736 369/53.21 |
| 2005/0047294 A1* | 3/2005 | Park | .................. | G11B 20/1883 369/47.14 |
| 2005/0169132 A1* | 8/2005 | Kuraoka | ........... | G11B 7/00375 369/47.14 |
| 2006/0181979 A1* | 8/2006 | Fukuda | ................. | G11B 20/10 369/47.1 |
| 2006/0233078 A1* | 10/2006 | Terada | ............... | G11B 20/1217 369/53.24 |
| 2007/0070846 A1* | 3/2007 | Tokiwa | ............. | G11B 7/00736 369/47.53 |
| 2012/0099415 A1* | 4/2012 | Senno | ............... | G11B 7/00736 369/275.4 |

FOREIGN PATENT DOCUMENTS

| | | |
|---|---|---|
| JP | 2012-003816 | 1/2012 |
| JP | 2015-001998 | 1/2015 |

* cited by examiner

FIG. 27

(1) DFL (Defect List (DEFECT REGION INFORMATION))

| ENTRY | SECTOR No. | RECORDED/UNRECORDED INFORMATION |
|---|---|---|
| ENTRY 1 | 0x10000C0~0x10000E0 | UNRECORDED |
| ENTRY 2 | 0x1000020~0x10002D0 | UNRECORDED |
| ENTRY 3 | 0x1000420~0x1000440 | RECORDED |
| ⋮ | ⋮ | ⋮ |
| ENTRY n | 0x1000AC0~0x100EA50 | UNRECORDED |

(2) LRA OF SRR (Last Record Address (LAST RECORD POSITION INFORMATION))

| CLUSTER | LAST RECORD CLUSTER No. |
|---|---|
| CLUSTER 1 | 0x1000600 |
| CLUSTER 2 | 0x1000EA0 |
| ⋮ | ⋮ |
| CLUSTER n | 0x100BAC0 |

INFORMATION PROCESSING DEVICE, INFORMATION RECORDING MEDIUM, INFORMATION PROCESSING METHOD, AND PROGRAM

CROSS REFERENCE TO PRIOR APPLICATION

This application is a National Stage Patent Application of PCT International Patent Application No. PCT/JP2016/056350 (filed on Mar. 2, 2016) under 35 U.S.C. § 371, which claims priority to Japanese Patent Application No. 2015-059082 (filed on Mar. 23, 2015), which are all hereby incorporated by reference in their entirety.

TECHNICAL FIELD

The present disclosure relates to an information processing device, an information processing method, and a program. More particularly, the present disclosure relates to an information processing device, an information recording medium, an information processing method, and a program capable of achieving high-density recording to realize recording of large capacity data.

BACKGROUND ART

As recording media on which various kinds of data are recorded, optical discs such as digital versatile discs (DVDs) or Blu-ray (registered trademark) discs (BDs) are used often.

In general optical discs, lands (ridge portions) and grooves (valley portions) are formed. With the land and groove configuration, a tracking process of specifying a track position even in a data-unrecorded state can be performed.

In general discs of the past, a data recording process was performed only on grooves and data recording was not performed on lands on either side of the grooves.

A configuration of an optical disc that has lands and grooves and an example of a data recording process are disclosed in, for example, Patent Literature 1 (JP 2015-1998A).

In recent years, as a scheme of further improving a data recording density to increase a data recording capacity, a land and groove recording scheme of recording data not only on grooves but also on lands has been proposed.

By performing data recording on both lands and grooves in this way, it is possible to almost double an amount of data which can be recorded on one disc.

However, when the land and groove recording scheme is applied, data recording errors occur in certain conditions.

Specifically, for example, when data recording is attempted on certain grooves, the data recording is not correctly performed on the grooves and a recording error may occur when one of the lands on either side of the grooves is a land on which the data recording is finished and the other land is a data unrecorded land.

One cause for such recording errors is considered to be that a minute difference occurs in reflected light from lands on both sides of a groove of a data recording region and tracking is not accurately performed.

CITATION LIST

Patent Literature

Patent Literature 1: JP 2015-1998A

DISCLOSURE OF INVENTION

Technical Problem

The present disclosure is devised in view of the foregoing problem and an object of the present disclosure is to provide an information processing device, an information recording medium, an information processing method, and a program preventing a recording error to realize reliable data recording in a data recording process to which a land and groove recording scheme of recording data on both lands and grooves of an optical disc is applied.

Solution to Problem

According to a first aspect of the present disclosure, an information processing device includes: a data processing unit configured to control a data recording process on both lands and grooves of an optical disc. When data is recorded on the lands or the grooves, the data processing unit performs a process of detecting positions at which data recording states of grooves or lands on both sides adjacent to a data recording target land or groove match with each other, or the data processing unit performs a process of matching data recording states of grooves or lands on both sides adjacent to a data recording target land or groove with each other.

In addition, according to a second aspect of the present disclosure, an information recording medium is capable of recording data on both lands and grooves, the information recording medium being configured to record defect region information (defect list (DFL)) in which an identifier of a defection region is recorded and last data recording position information in each cluster, as management information of a data recording state.

In addition, according to a third aspect of the present disclosure, there is provided an information processing method of controlling data recording on an optical disc in an information processing device. The information processing device includes a data processing unit that controls a data recording process on both lands and grooves of the optical disc. When data is recorded on the lands or the grooves, the data processing unit performs a process of detecting positions at which data recording states of grooves or lands on both sides adjacent to a data recording target land or groove match with each other, or the data processing unit performs a process of matching data recording states of grooves or lands on both sides adjacent to a data recording target land or groove with each other.

In addition, according to a fourth aspect of the present disclosure, a program causes an information processing device to control data recording on an optical disc. The information processing device includes a data processing unit that controls a data recording process on both lands and grooves of the optical disc. When data is recorded on the lands or the grooves, the program causes the data processing unit to perform a process of detecting positions at which data recording states of grooves or lands on both sides adjacent to a data recording target land or groove match with each other, or to perform a process of matching data recording states of grooves or lands on both sides adjacent to a data recording target land or groove with each other.

Note that a program according to the present disclosure is, for example, a program provided in computer-readable format to an information processing device or a computer system capable of executing various program code, the program being providable by a storage medium or communication medium. By providing such a program in a computer-readable format, processing corresponding to the program is realized on the information processing device or the computer system.

Further objectives, features, and advantages of the present disclosure will be clarified by a more detailed description based on the embodiments of the present disclosure described hereinafter and the attached drawings. Note that in this specification, the term "system" refers to a logical aggregate configuration of multiple devices, and the respective devices of the configuration are not limited to being inside the same housing.

Advantageous Effects of Invention

According to a configuration of an embodiment of the present disclosure, a configuration for preventing a recording error when a data recording process is performed on both lands and grooves of an optical disc is realized.

Specifically, an information processing device includes a data processing unit configured to control a data recording process on both lands and grooves of an optical disc. The data processing unit performs a process of detecting or matching positions at which data recording states of grooves or lands on both sides adjacent to a data recording target land or groove match when data is recorded on the lands or the grooves. The data processing unit performs, for example, a dummy data recording process or a skipping process as the process of matching the data recording states of the grooves or the lands on both sides adjacent to the data recording target land or groove.

In this configuration, a configuration for preventing a recording error when a data recording process is performed on both lands and grooves of an optical disc is realized.

Note that the advantageous effects described in this specification are merely for the sake of example and non-limiting, and there may be additional advantageous effects.

BRIEF DESCRIPTION OF DRAWINGS

FIG. 27 is a diagram for describing an example of management information.

MODE(S) FOR CARRYING OUT THE INVENTION

Figure 1:
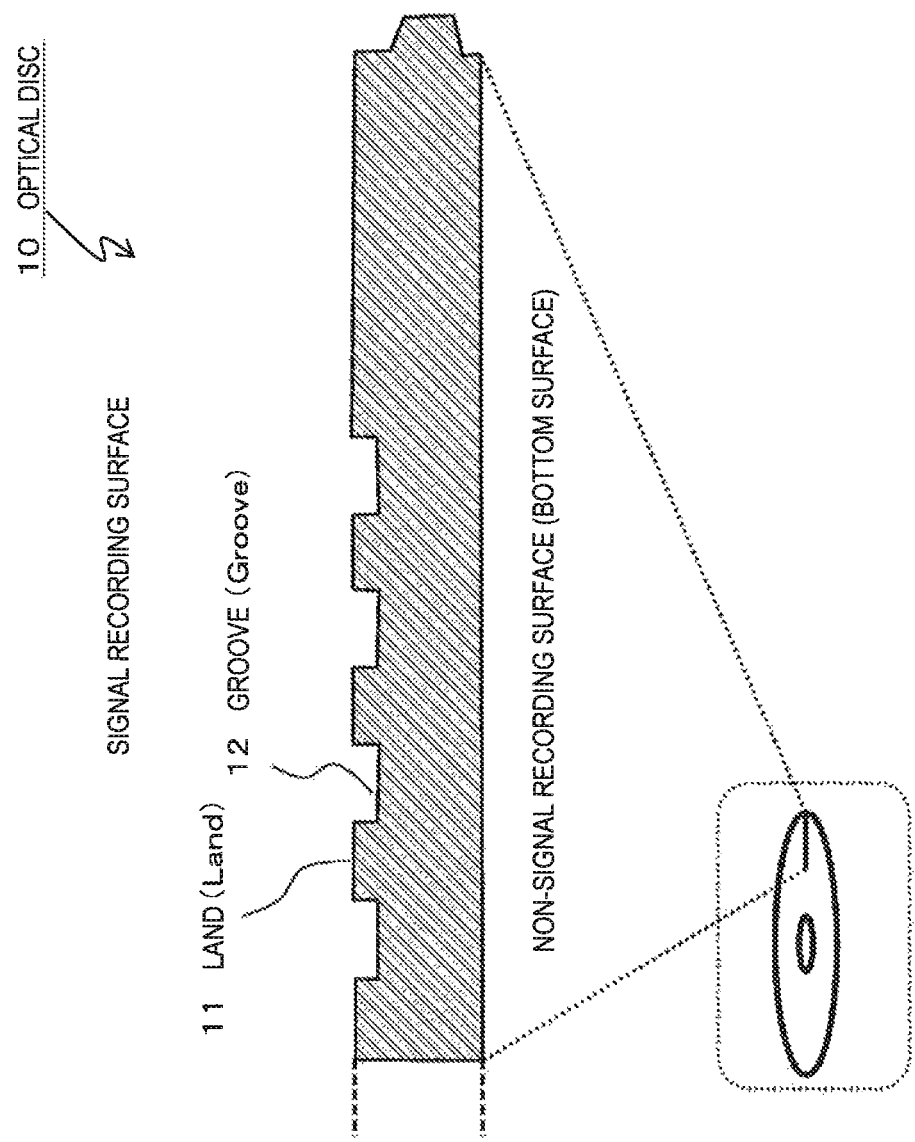
FIG. 1 is a diagram for describing an example of a configuration of an optical disc.

Hereinafter, an information processing device, an information recording medium, an information processing method, and a program according to the present disclosure will be described in detail with reference to the drawings. The description will be made in accordance with the following items.
1. Configuration of optical disc and land and groove recording scheme
2. Configuration for preventing recording error in land and groove recording scheme
2-1. (Embodiment 1) Embodiment in which error occurrence is prevented by dummy data recording
2-1-1. (Process example 1) Process example in SRR boundary
2-1-2. (Process example 2) Process example at user data region start position 2-1-3. (Process example 3) Process example at spare region start position 2-1-4. (Process example 4) Process example in defect cluster region skip destination 2-2. (Embodiment 2) Embodiment in which occurrence of error is prevented by recording skipping of adjacent cluster of defect cluster 2-3. (Embodiment 3) Embodiment in which occurrence of error is prevented when area division striping is performed 3. Management information 4. Configuration example of information processing device 5. Summary of configuration according to the present disclosure

1. Configuration of Optical Disc and Land and Groove Recording Scheme

First, a configuration of an optical disc and a land and groove recording scheme will be described.

FIG. 1 is a diagram illustrating a cross-sectional configuration of, for example, an optical disc such as a Blu-ray (registered trademark) disc (BD).

As illustrated in FIG. 1, lands 11 which are ridge portions and grooves 12 which are valley portions are formed on an optical disc 10.

In general discs of the past, a data recording process is performed only on the grooves 12 and data recording is not performed on the lands 11 between the grooves 12. This recording scheme is referred to as a groove recording scheme.

In recent years, as a scheme of further improving a data recording density to increase a data recording capacity, a land and groove recording scheme of recording data not only on grooves but also on lands has been proposed.

Figure 2:
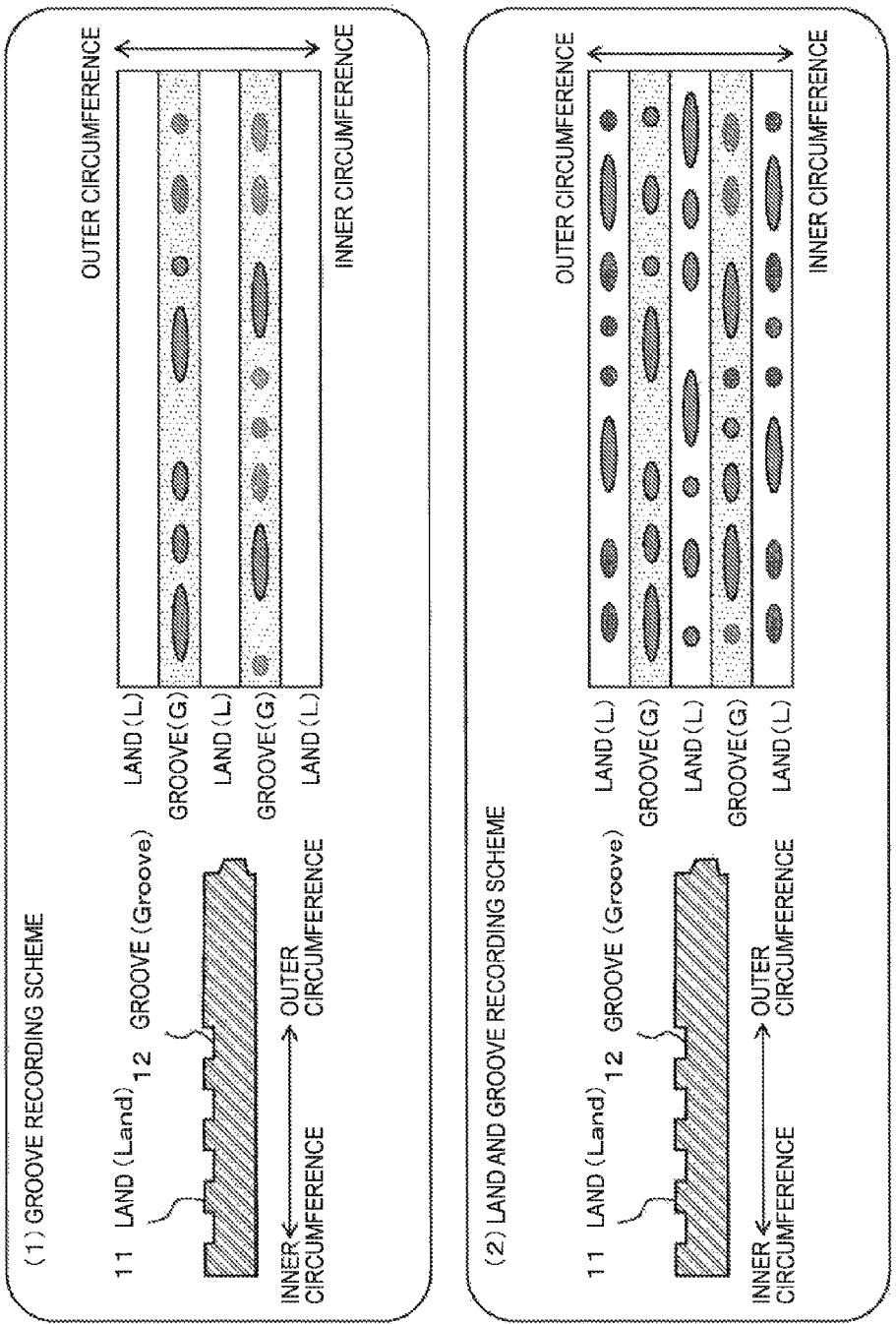
FIG. 2 is a diagram for describing a data recording scheme on an optical disc.

FIG. 2 is a diagram for describing the following two data recording schemes:

(1) a groove recording scheme; and (2) a land and groove recording scheme.

As illustrated in the drawing, (1) the groove recording scheme is a scheme of recording data only on the grooves 12 without recording data on the lands 11.

On the other hand, (2) the land and groove recording scheme is a scheme of recording data not only on the grooves 12 but also on the lands 11.

By performing data recording on both lands and grooves in this way, it is possible to almost double an amount of data which can be recorded on one disc.

However, when the land and groove recording scheme is performed, recording errors occur in some cases at the time of data recording.

For example, when data recording is attempted on grooves of a certain region, the data recording is not correctly performed on the grooves and a recording error may occur when one of the lands on either side of the grooves is in a state in which the data recording is finished and the other land is in a data-unrecorded state.

One cause for such recording errors is considered to be that a minute difference occurs in reflected light from lands on both sides of a groove of a data recording region and tracking is not accurately performed.

A specific example will be described with reference to FIG. 3.

When the land and groove recording scheme is applied and the data recording is performed, for example, data recording is performed on the lands (L) and data recording is subsequently performed on the grooves (G). Alternatively, after the data recording is performed on the grooves (G), the data recording is performed on the lands (L). Either of the processes is performed.

Also, in the description of the following embodiment, a problem occurring when the data recording is performed first on the lands (L) and the data recording is subsequently performed on the grooves (G) will be described. The same problem occurs when the recording order of the lands (L) and the grooves (G) is reversed.

In either case, by applying the process of the present disclosure, it is possible to resolve a problem of a recording error.

Figure 3:
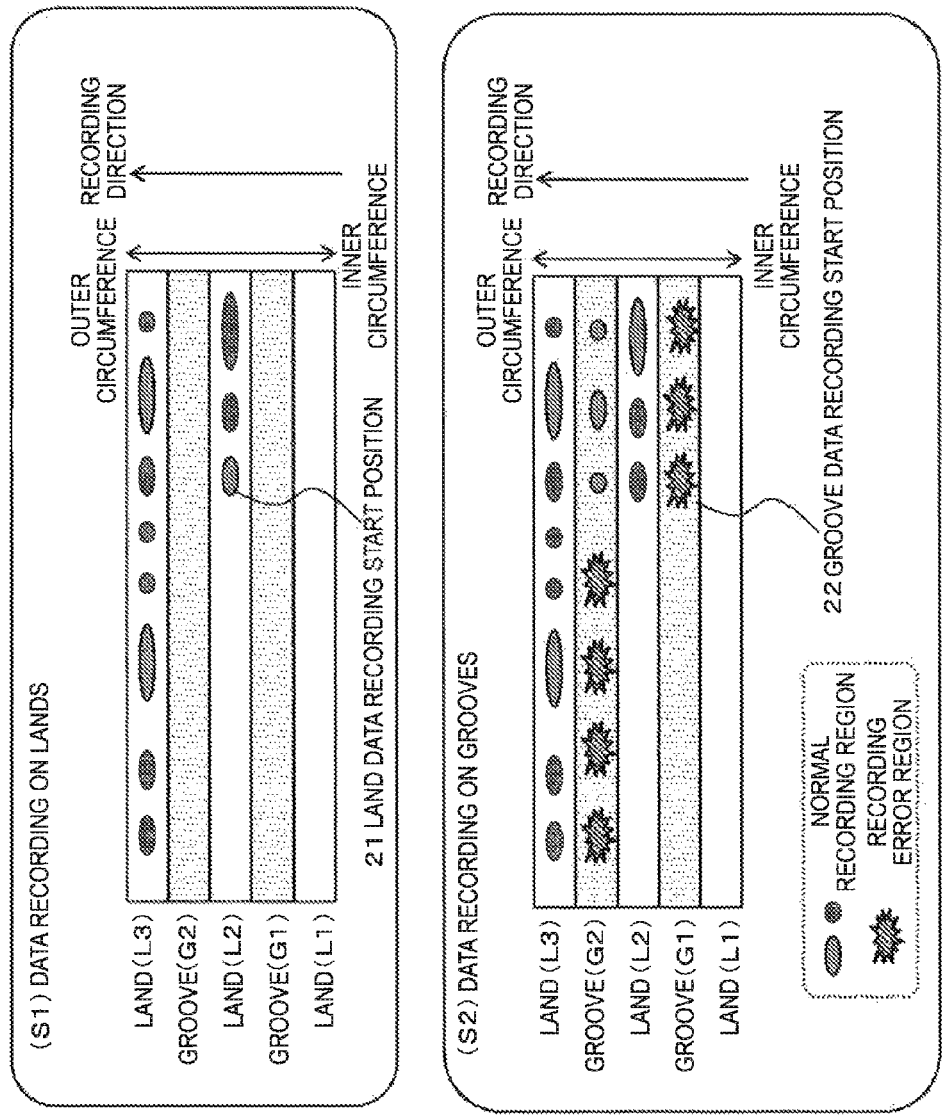
FIG. 3 is a diagram for describing a recording error in the optical disc.

FIG. 3 illustrates an occurrence example of a data recording error when the data recording is performed first on the lands. FIG. 3 illustrates an occurrence example of a recording error when the following two steps (S1) and (S2) are performed chronologically:

(S1) data recording on lands; and (S2) data recording on grooves.

(S1) Data Recording on Lands

The drawing of step S1 illustrated in the upper part of FIG. 3 illustrates a state in which data recording is performed from a certain position (a land data recording start position 21) of a certain land (L) of a disc in an unrecorded state.

Also, the data recording is performed from the inner circumference to the outer circumference of the disc.

The example illustrated in the drawing indicates a state in which the data recording is started from the land data recording start position 21 of a land (L2) and the data recording is further performed on a land (L3) of the outer circumference.

As illustrated on the right side in the drawing, the lower side corresponds to the inner circumference of the disc and the upper side corresponds to the outer circumference of the disc.

(S2) Data Recording on Grooves

After the data recording is performed on the lands in step S1, the data recording is performed on the grooves in step S2.

The data recording on the grooves is performed from the inner circumference of the disc toward the outer circumference.

The example illustrated in the drawing indicates a state in which the data recording is started from a groove data recording start position 22 of a groove (G1) and the data recording is further performed on a groove (G2) of the outer circumference.

As illustrated in the drawing, a recording error occurs for all of the recorded data on the groove (G1), a recording error occurs in the recording data in the groove (G2) in the first-half region (the left side of the drawing), and only the second-half portion is a normal recording region.

In recording error regions on the grooves, the data recording is finished on one of the lands on either side of the grooves and the other land is a region in a data-unrecorded state:

(a) Recorded data on the groove (G1); and (b) Recorded data in a first-half region (the left side in the drawing) of the groove (G2).

At the time of the data recording in the groove region, one of the lands on either side of the groove is in a state in which the data recording is finished and the other land is a region in a data-unrecorded state.

In such a region, a recording error occurs.

On the other hand, the second half region (the right side in the drawing) of the groove (G2) is a normal recording region and the data recording is correctly performed.

This region is in a state in which the data recording is finished on both of the lands on either side of the groove when the data recording is performed.

In such a region, no recording error occurs and normal data recording is performed.

In this way, normal data recording is possible when data recording states of the lands on both sides of a groove are the same in the data recording on the groove, that is, when the state is one of the following cases:

the lands on both sides are in a state in which the data recording is finished; and the lands on both sides are in a data-unrecorded state.

However, when the data recording states of the lands on both sides are different, that is, when one of the lands on either side is in a state in which the data recording is finished and the other land is in a data-unrecorded state, the normal data recording is not performed and a recording error occurs.

One cause for such recording errors is considered to be that a minute difference occurs in reflected light from lands on both sides of a groove of a data recording region and tracking is not accurately performed.

Also, such an error occurs in a data recording process on a land as well.

That is, normal data recording is possible when data recording states of grooves on both sides of a land are the same in the data recording on the land, that is, when the grooves on both sides are in a state in which the data recording is finished or the grooves on both sides are in a data-unrecorded state.

However, when the data recording states of the grooves on both sides are different, that is, one of the grooves on either side is in a state in which the data recording is finished and the other groove is in a data-unrecorded state, the normal data recording is not performed and a recording error occurs.

2. Configuration for Preventing Recording Error in Land and Groove Recording Scheme Next, a configuration for preventing a recording error in the land and groove recording scheme will be described.

First, an example of a data recording configuration of a disc will be described with reference to FIG. 4.

Figure 4:
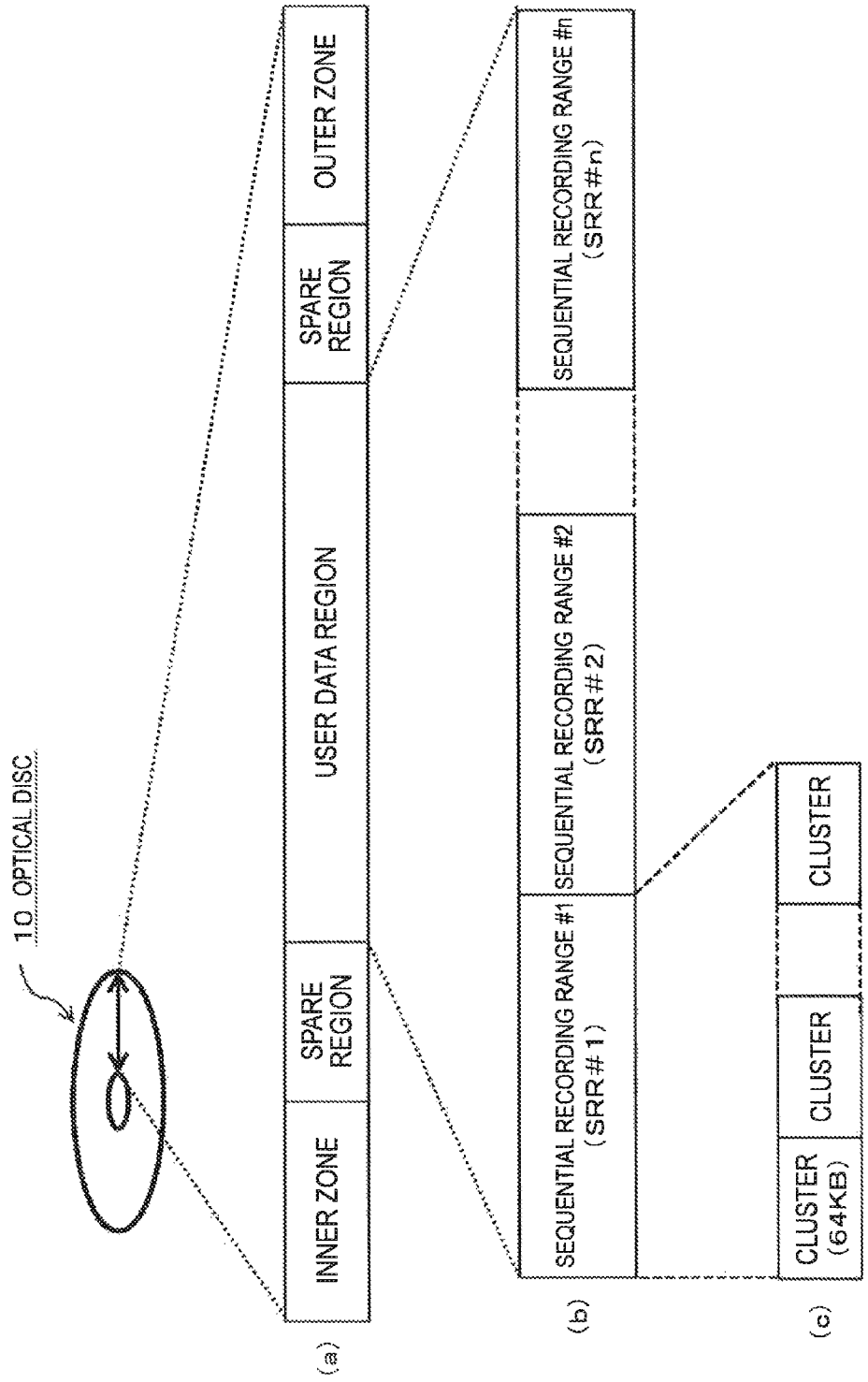
FIG. 4 is a diagram for describing an example of a data recording configuration of the optical disc.

FIG. 4 is a diagram for describing an example of a data recording configuration of the optical disc 10.

(a) of FIG. 4 illustrates each data region set in the inner circumference to the outer circumference of the optical disc.

An inner zone at an inner circumference end or an outer zone at the outer circumference end is a recording region such as management information of the disc. For example, the inner zone or the outer zone is a recording region of a disc management area (DMA).

Also, the disc management area (DMA) is disc management information that is generated after a finalization process performed when the data recording of the disc is completed and it is confirmed that a postscript process is not performed after the data recording.

Before the finalization process is performed, that is, when additional recording of data on the disc is possible, a temporary DMA (TDMA) which is temporary management information is generated, updated, and recorded.

The DMA or the TDMA is recorded in the inner zone at the inner circumference end or the outer zone at the outer circumference end.

Spare regions are set in a portion adjacent to the inner zone at the inner circumference end and a portion adjacent to the outer zone at the outer circumference end.

The spare regions are used as substitution regions of data recording error regions in a user data region. For example, the spare regions are used as alternative regions of data regions in which data recording or reading occurring in the user data region may not be possible.

The user data region is a region in which various kinds of user data are recorded.

(b) and (c) of FIG. 4 illustrate a detailed configuration of the user data region.

As illustrated in (b) of FIG. 4, the user data region is divided into a plurality of sequential recording ranges (SRRs). In the sequential recording ranges (SRRs), sequential data can be recorded at consecutive addresses.

Also, the SRR is a concept that is unique to recordable discs (media such as optical discs on which it is necessary to perform recording sequentially) and the present process example is also applicable to recordable discs.

When new user data is recorded on a recordable disc, data recording is started from a start position of one SRR.

Also, information regarding a data recording state of the SRR, that is, information regarding whether the recording is finished, is recorded in the DMA or the TDMA.

The SRR set in the user data region is configured to include clusters, as illustrated in (C) of FIG. 4.

The cluster is a 64-KB data recording region. The data recording on the disc is performed in units of 64-KB clusters.

Also, the cluster is configured to include 32 2-KB sectors.

Hereinafter, a plurality of embodiments will be described below in order as configurations for preventing a recording error in the land and groove recording scheme:

(Embodiment 1) Embodiment in which occurrence of error is prevented by dummy data recording;

(Embodiment 2) Embodiment in which occurrence of error is prevented by recording skipping of adjacent cluster of defect cluster (Embodiment 3) Embodiment in which occurrence of error is prevented when area division striping is performed 2-1. (Embodiment 1) Embodiment in which Occurrence of Error is Prevented by Dummy Data Recording First, an embodiment in which occurrence of an error is prevented by dummy data recording will be described as Embodiment 1 with reference to FIG. 5 and the subsequent drawings.

In Embodiment 1, the following three process examples will be described in order:

(Process Example 1) Process example in SRR boundary;

(Process Example 2) Process example at user data region start position;

(Process Example 3) Process example at spare region start position; and (Process Example 4) Process example in defect cluster region skip destination.

2-1-1. (Process Example 1) Process Example in SRR Boundary

First, a process example in a sequential recording range (SRR) boundary will be described with reference to FIG. 5 and the subsequent drawings.

As described with reference to FIG. 4, the user data region is divided into a plurality of sequential recording ranges (SRRs). In the sequential recording ranges (SRRs), sequential data can be recorded at consecutive addresses.

Also, as described above, the SRR is a concept that is unique to recordable discs (media such as optical discs on which it is necessary to perform recording sequentially) and the present process example is also applicable to recordable discs.

When new user data is recorded on a recordable disc, data recording is started from a start position of one SRR.

Figure 5:
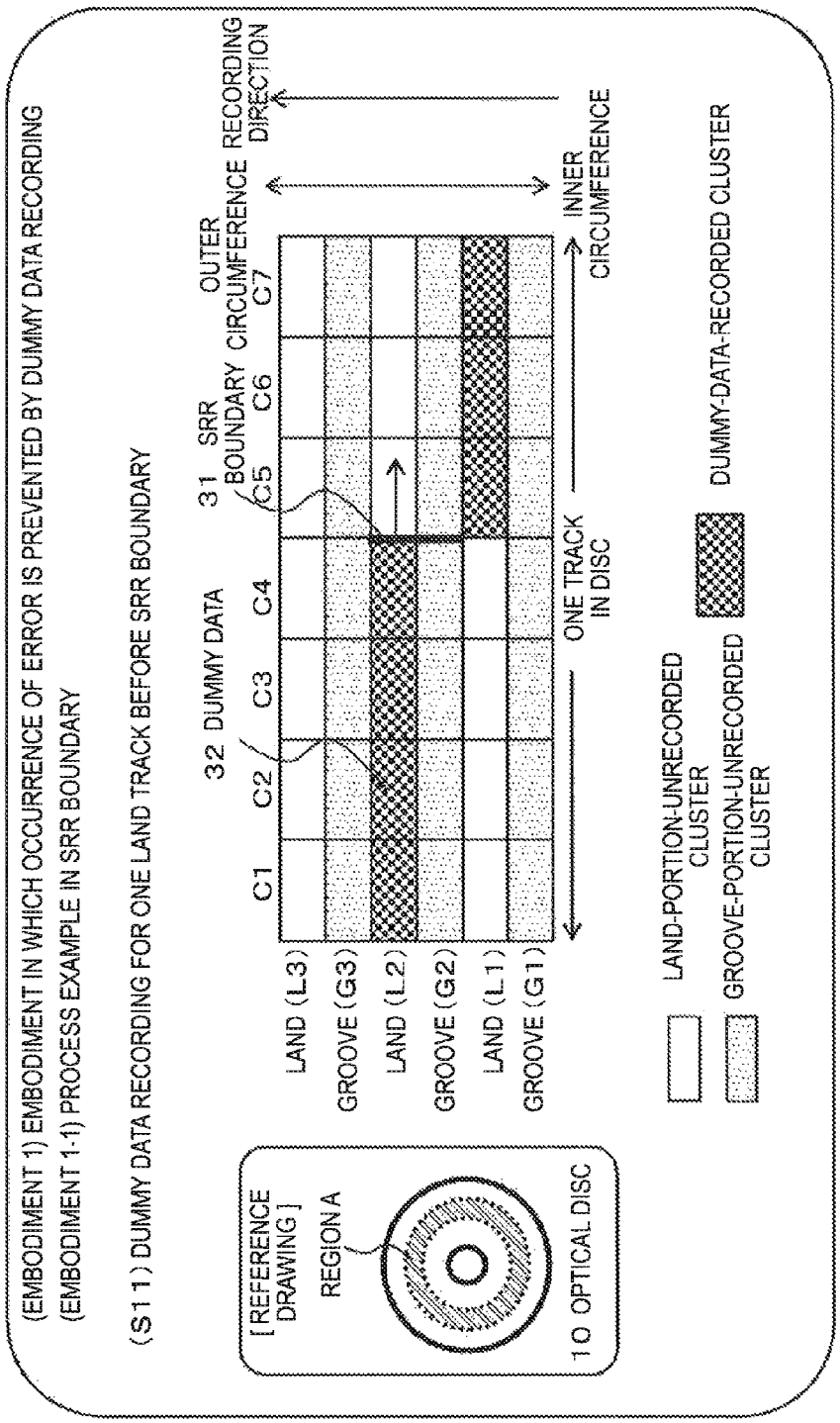
FIG. 5 is a diagram for describing an embodiment in which error occurrence is prevented by dummy data recording and a process example in an SRR boundary.

A reference drawing in FIG. 5 illustrates a region A that forms a part of a user data region of the optical disc 10.

The drawing on the right side of the reference drawing of FIG. 5 illustrates a detailed configuration of the region A, that is, a land and groove configuration from the inner circumference to the outer circumference of the disc in the region A.

A cluster configuration of data recording portions of the groove (G1), the land (L1), the groove (G2), the land (L2), a groove (G3), and the land (L3) from the inner circumference side to the outer circumference side of the disc in the region A is indicated.

One rectangular region corresponds to one cluster (64 KB).

The vertical direction is equivalent to a radial direction of the disc, the lower side is the inner circumference portion of the disc, and the upper side is the outer circumference portion of the disc. A left end to a right end is equivalent to one track in a disc.

A data recording process is performed individually in groove and land portions. In addition, a data recording direction is directed from the left to the right and is directed from the inner circumference side (the lower side) to the outer circumference side (the upper side).

The example illustrated in FIG. 5 is an example in which both the land and the groove are configured to include 7 clusters per track. Here, this setting is merely an example and the number of clusters per track can be set variously.

(Process example 1) A process example in the SRR boundary is a process example when recording of user data starts from one certain SRR boundary of the user data region.

Also, a recording process sequence of the embodiment to be described below is a process example in which recording of the lands (L) is antecedently performed and recording of the grooves (G) is subsequently performed. However, this is merely an example, and recording of the grooves (G) can also be antecedently performed and recording of the lands (L) can be subsequently performed. In either case, the process of the present disclosure can be applied and the same error prevention effect can be obtained.

(Process example 1) A process of causing a recording error not to occur in the recording of the user data from the SRR boundary will be described.

Three process steps (steps S11 to S13) that are chronologically performed will be described in order with reference to FIGS. 5 to 7. Also, before step S11 is performed, both of a land and a groove in the region A are assumed to be in a data-unrecorded state. That is, all the clusters that form the groove (G1) to the land (L3) illustrated in FIG. 5 are assumed to be configured as land-portion-unrecorded clusters and groove-portion-unrecorded clusters.

Figure 6:
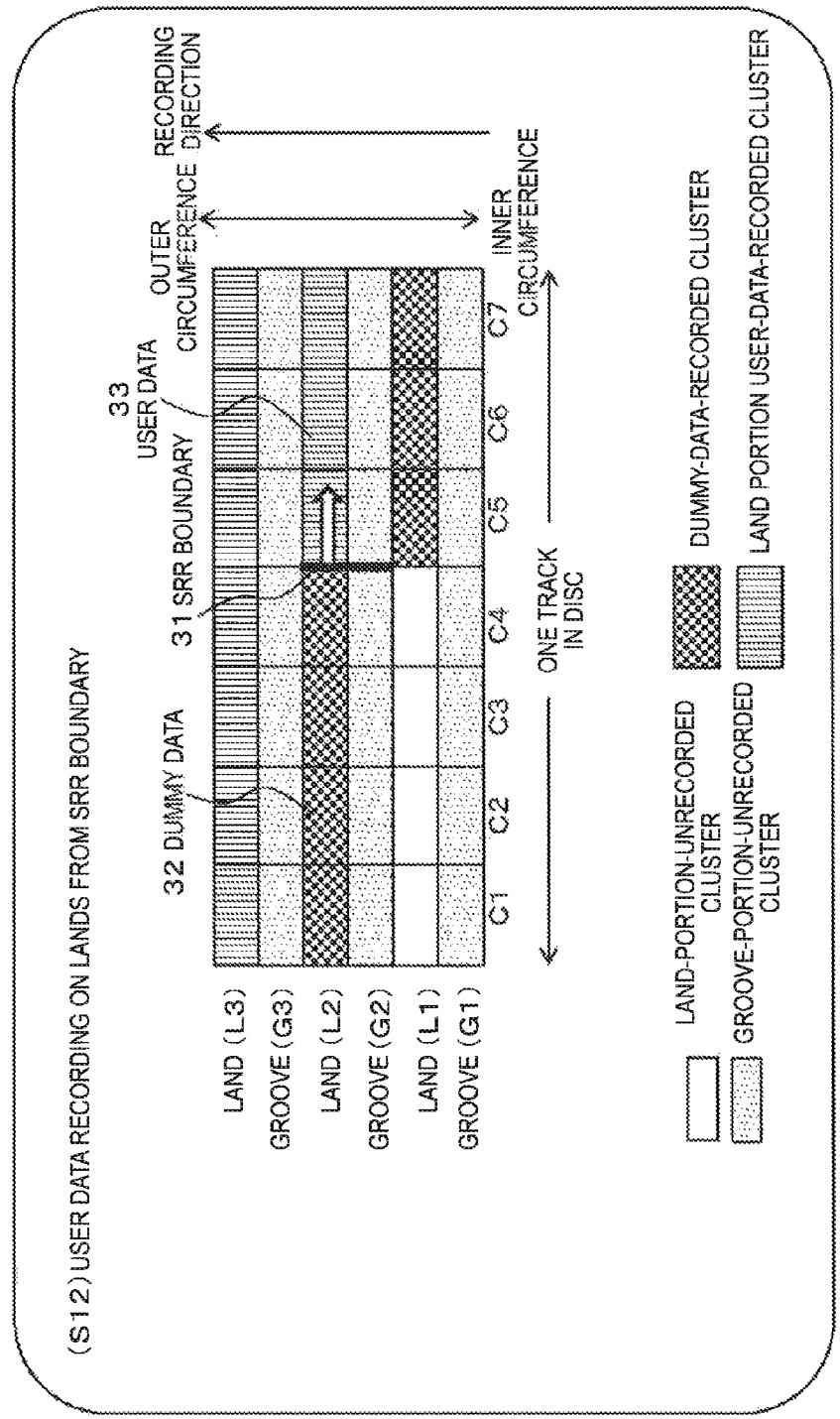
FIG. 6 is a diagram for describing an embodiment in which error occurrence is prevented by dummy data recording and a process example in an SRR boundary.
Figure 7:
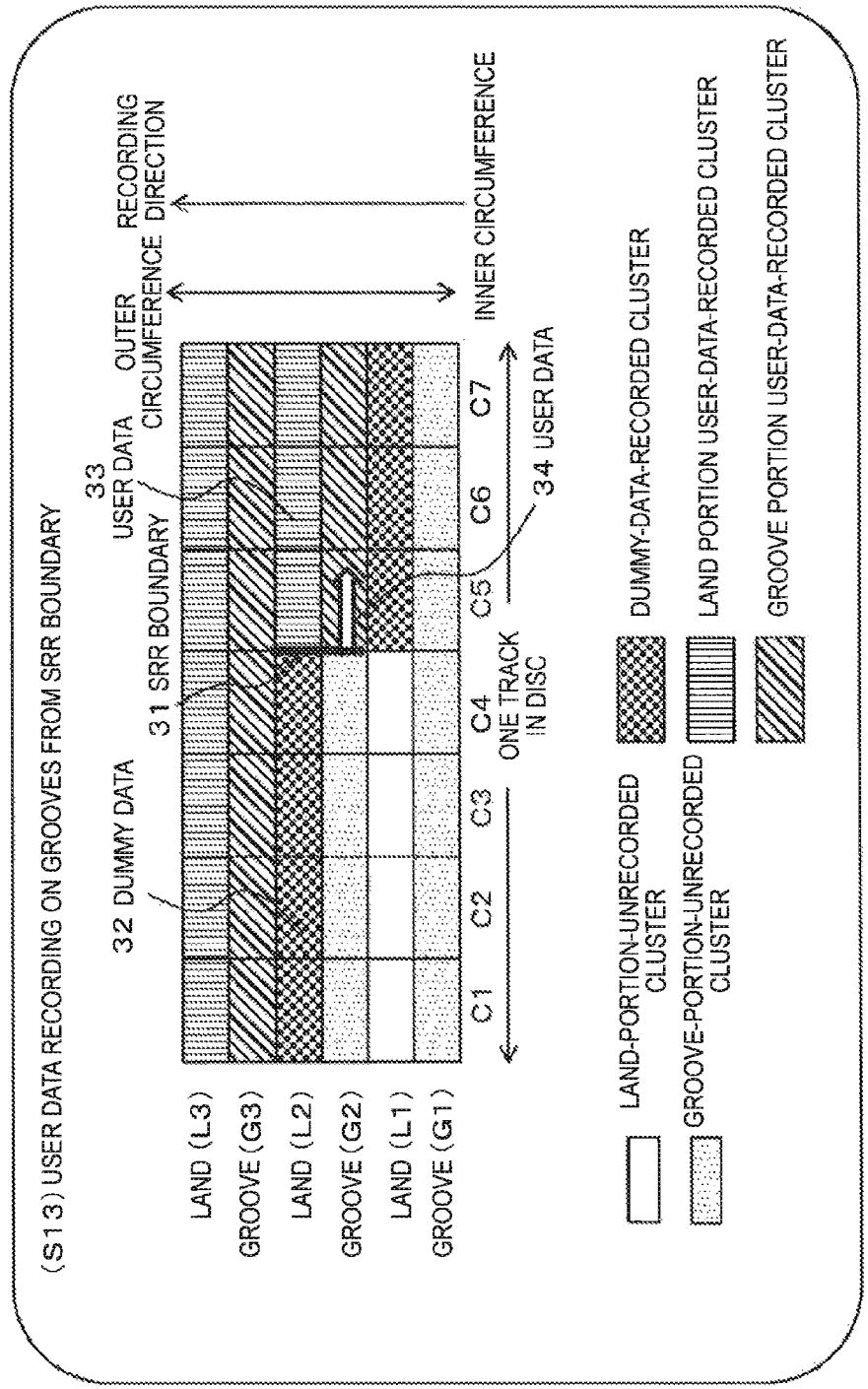
FIG. 7 is a diagram for describing an embodiment in which error occurrence is prevented by dummy data recording and a process example in an SRR boundary.

The following three chronological process steps (steps S11 to S13) will be described in order with reference to FIGS. 5 to 7:

(Step S11) dummy data recording for one land track before the SRR boundary (FIG. 5)
(Step S12) user data recording on the lands from the SRR boundary (FIG. 6); and
(Step S13) user data recording on the grooves from the SRR boundary (FIG. 7).
(Step S11) dummy data recording for one land track before the SRR boundary.

First, a process for "the dummy data recording for one land track before the SRR boundary" which is performed as a preliminary process before recording of user data is started will be described with reference to FIG. 5.

In the process example, it is assumed that recording of user data is scheduled to start from an SRR boundary 31 illustrated in FIG. 5. It is assumed that the user data is scheduled to be recorded in a direction indicated by an arrow extending from the SRR boundary 31 illustrated in the drawing. That is, recording of the user data starts from a cluster (C5) of the land (L2). Since the data recording is performed from the inner circumference to the outer circumstance of the disc, the user data is recorded on clusters (C5 to C7) of the land (L2) and the user data is subsequently recorded on clusters (C1 to C7) of the land (L3).

In step S11, dummy data equivalent to one track in a disc before the SRR boundary 31 is recorded before the process of recording the user data.

Dummy data 32 is illustrated in FIG. 5.

As illustrated in FIG. 5, the dummy data is recorded on the clusters (C5 to C7) of the land (L1) and clusters (C1 to C4) of the land (L2). The recording regions of the dummy data 32 are equivalent to one track in a disc.

Also, when the dummy data 32 is recorded, the grooves on both sides of a land on which the dummy data 32 is recorded are all in a data-unrecorded state and the dummy data 32 can be recorded through a correct tracking process.

In this way, in step S11, the dummy data equivalent to one track in a disc is recorded on the land before the SRR boundary 31 which is a recording start point of the user data.
(Step S12)

After the dummy data recording process in step S11, a process of step S12 illustrated in FIG. 6 is performed.

The process of step S12 is a user data recording process from the SRR boundary 31.

User data 33 is recorded in a direction indicated by an arrow extending from the SRR boundary 31 of the land (L2) illustrated in FIG. 6. That is, recording of the user data starts from the cluster (C5) of the land (L2), the user data is recorded on the clusters (C5 to C7) of the land (L2), and the user data 33 is subsequently recorded on clusters (C1 to C7) of the land (L3).

When the user data 33 is recorded on the lands (L2 and L3), both grooves on both sides of each land on which the user data 33 is recorded are in a data-unrecorded state and the user data 33 can be recorded through a correct tracking process.
(Step S13)

After the process of recording the user data 33 on the lands in step S12, the process of step S13 illustrated in FIG. 7 is performed.

The process of step S13 is a process of recording user data on grooves.

User data 34 is recorded in a direction indicated by an arrow extending from the SRR boundary 31 of the groove (G2) illustrated in FIG. 7. That is, recording of the user data starts from a cluster (C5) of the groove (G2), the user data is recorded on the clusters (C5 to C7) of the groove (G2), and the user data 34 is subsequently recorded on clusters (C1 to C7) of the groove (G3).

When user data 34 is recorded on the grooves (G2 and G3), the lands on both sides of each groove on which the user data 34 is recorded are all in a data-recorded state and the user data 34 can be recorded through a correct tracking process.

That is, both sides of the clusters (C5 to C7) of the groove (G2) on which the user data 34 is recorded are clusters which are interposed between the following clusters and in which data is recorded on the lands on both sides:

the clusters (C5 to C7) of the land (L1) which are the clusters on which the dummy data is recorded; and the clusters (C5 to C7) of the land (L2) which are the clusters on which the user data 33 is recorded.

In addition, both sides of the clusters (C1 to C7) of the groove (G3) on which the user data 34 is recorded are clusters which are interposed between the following clusters and in which data is recorded on the lands on both sides:

the clusters (C1 to C7) of the land (L2) which are the clusters on which the dummy data and the user data 33 are recorded; and the clusters (C1 to C7) of the land (L3) which are the clusters on which the user data 33 is recorded.

On the groove interposed by the lands in a state in which the states of both sides are the same data-recorded state, that is, the data-recorded state, the correct tracking process is possible, as described above with reference to FIG. 3 and the user data 34 can correctly be recorded without occurrence of a writing error.

As described above, the process of recording the user data on the lands and the grooves from the SRR boundary can be performed through the processes of steps S11 to S13 in FIGS. 5 to 7 without occurrence of an error.

In Process Example 1 in which the user data recording starts from the SRR boundary, the dummy data is recorded in a land region equivalent to one track in the land portion before the SRR boundary 31 as the preliminary process.

Through the dummy data recording process, an error is set not to occur when the user data is recorded on the grooves.

That is, through the recording of the dummy data 32, the lands on both sides of the groove can be set to be in the same data-recorded state when the user data is recorded on the groove from the SRR boundary 31. Thus, the user data 34 can correctly be recorded on the groove without occurrence of an error.

2-1-2. (Process Example 2) Process Example at User Data Region Start Position

Next, a process example at a user data region start position will be described with reference to FIG. 8 and the subsequent drawings.

As described with reference to FIG. 4, a user data region is a region interposed between spare regions and various kinds of user data are recorded.

Figure 8:
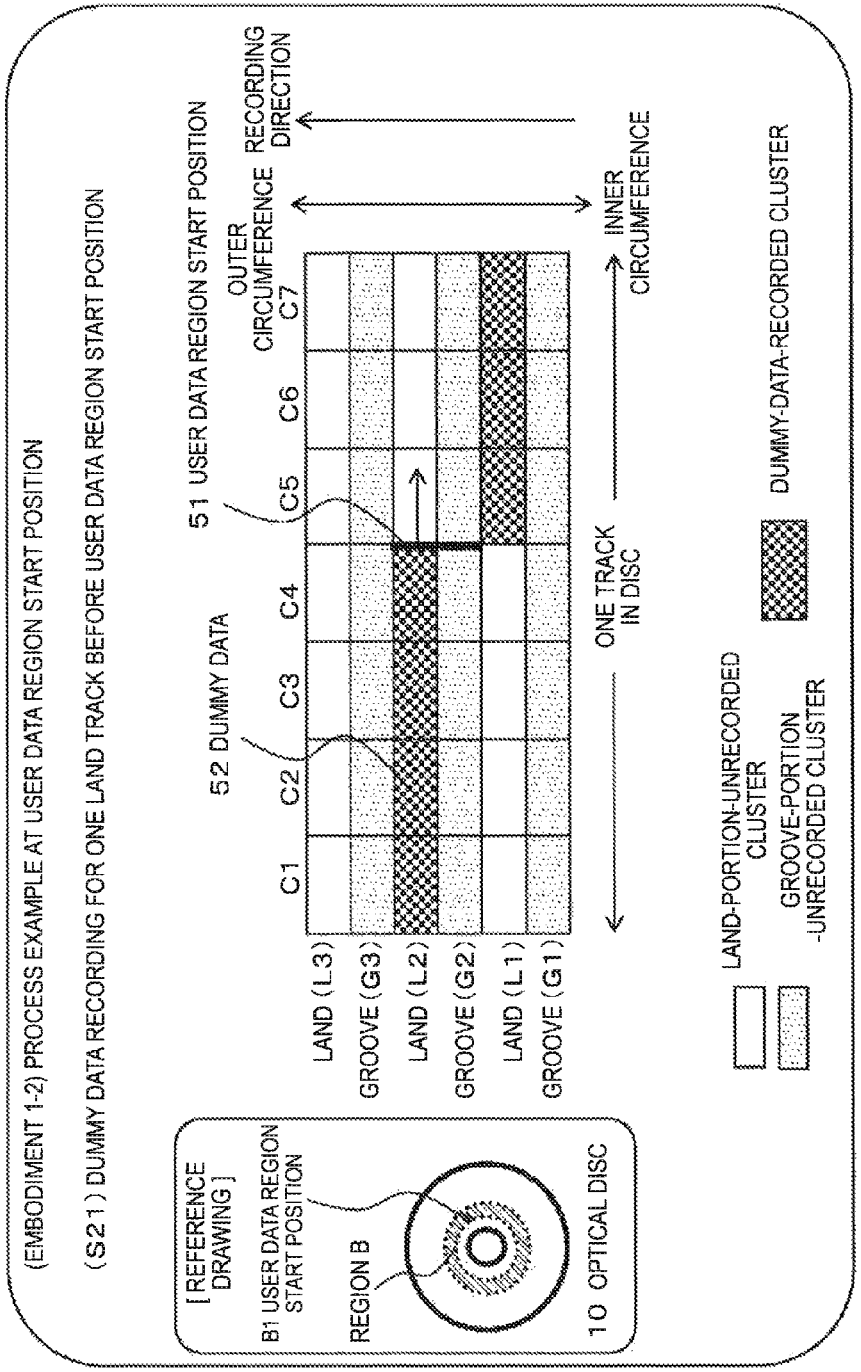
FIG. 8 is a diagram for describing an embodiment in which error occurrence is prevented by dummy data recording and a process example at a user data region start position.

A reference drawing in FIG. 8 illustrates a region B formed by a user data region of the optical disc 10 and a part of a spare region.

In the reference drawing, the region B includes a user data region start position B1 equivalent to a boundary between the user data region and the spare region.

Also, when the optical disc is a recordable disc and a disc in which a recording layer is only a single layer, the user data region start position corresponds to the SRR boundary described in Process Example 1. Accordingly, when the optical disc is a recordable single-layer disc, the above-described "(Process Example 1) process example in SRR boundary" may be applied. However, when the optical disc is a plural layer type disc including a plurality of recording layers, a user data region start position after a second layer may not necessarily correspond to the SRR boundary. In the case of the disc that has such a configuration, occurrence of an error can be prevented by applying the following Process Example 2.

FIG. 8 illustrates a detailed configuration of the region B, that is, a land and groove configuration from the inner circumference to the outer circumference of the disc in the region B.

A user data region start position 51 indicated in the land and groove configuration of FIG. 8 corresponds to a user data region start position B1 in the reference drawing.

FIG. 8 illustrates a cluster configuration of data recording portions of the groove (G1), the land (L1), the groove (G2), the land (L2), a groove (G3), and the land (L3) from the inner circumference side to the outer circumference side of the disc in the region B.

One rectangular region corresponds to one cluster (64 KB).

The vertical direction is equivalent to a radial direction of the disc, the lower side is the inner circumference portion of the disc, and the upper side is the outer circumference portion of the disc. A left end to a right end is equivalent to one track in a disc.

A data recording process is performed individually in groove and land portions. In addition, a data recording direction is directed from the left to the right and is directed from the inner circumference side (the lower side) to the outer circumference side (the upper side).

(Process Example 2) A process example at a user data region start position is a process example when recording of user data starts from a start position of a user data region.

Also, a recording process sequence of the embodiment example to be described below is a process example in which recording of the lands (L) is antecedently performed and recording of the grooves (G) is subsequently performed. However, this is merely an example, and the process according to the present disclosure can also be applied as a process in which recording of the grooves (G) is antecedently performed and recording of the lands (L) is subsequently performed. The same error prevention effect can be obtained.

(Process Example 2) A process of causing a recording error not to occur in recording of user data from the user data region start position will be described.

Three chronological process steps (steps S21 to S23) will be described in order with reference to FIGS. 8 to 10. Also, before step S21 is performed, both the lands and the grooves in the region B are assumed to be in a data-unrecorded state. That is, all the clusters that form the groove (G1) to the land (L3) illustrated in FIG. 8 are assumed to be configured as land-portion-unrecorded clusters and groove-portion-unrecorded clusters.

The following three chronological process steps (steps S21 to S23) will be described in order with reference to FIGS. 8 to 10:

(Step S21) dummy data recording for one land track before the user data region start position (FIG. 8)

Figure 9:
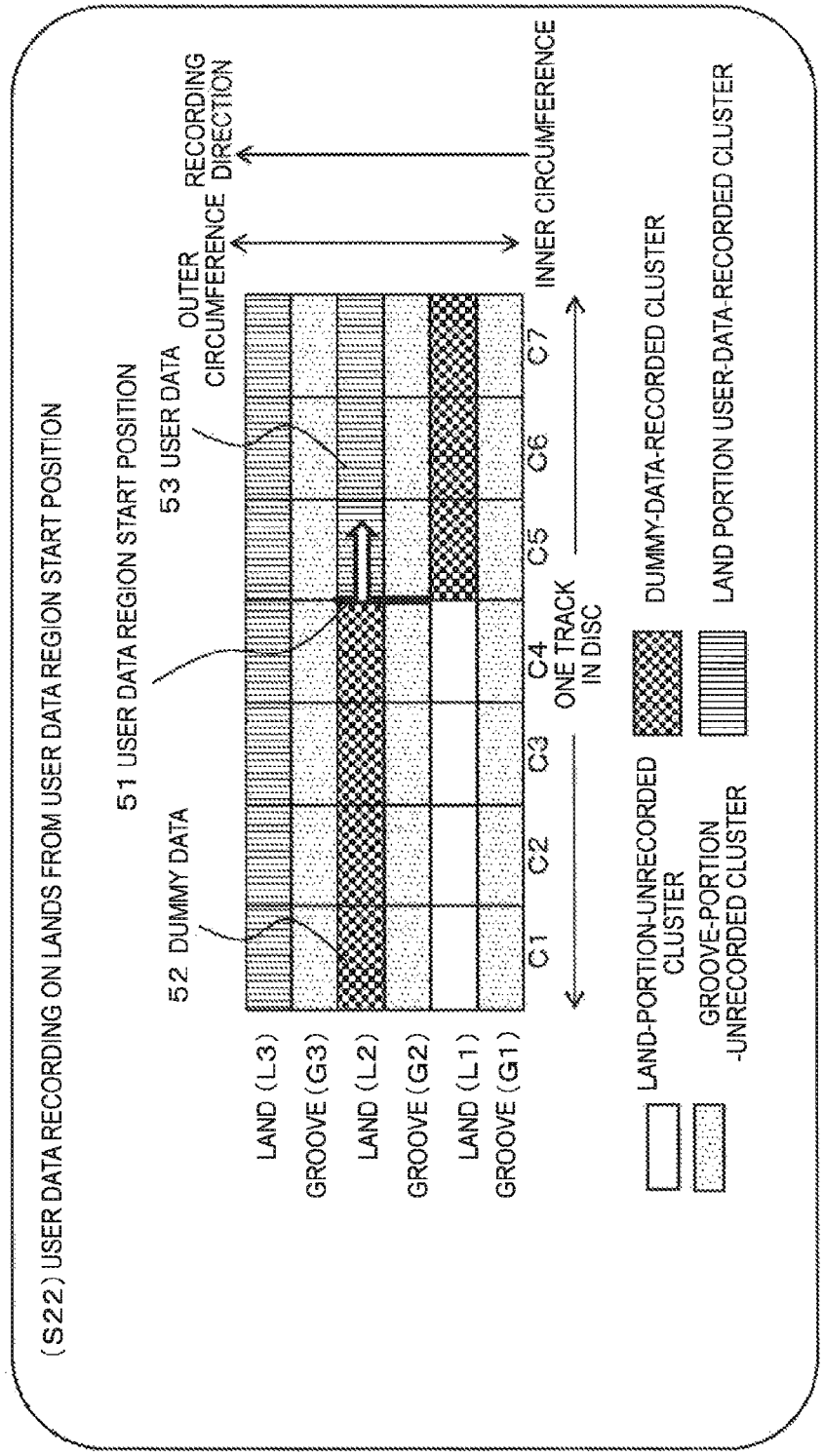
FIG. 9 is a diagram for describing an embodiment in which error occurrence is prevented by dummy data recording and a process example at a user data region start position.

(Step S22) user data recording on the lands from the user data region start position (FIG. 9)

Figure 10:
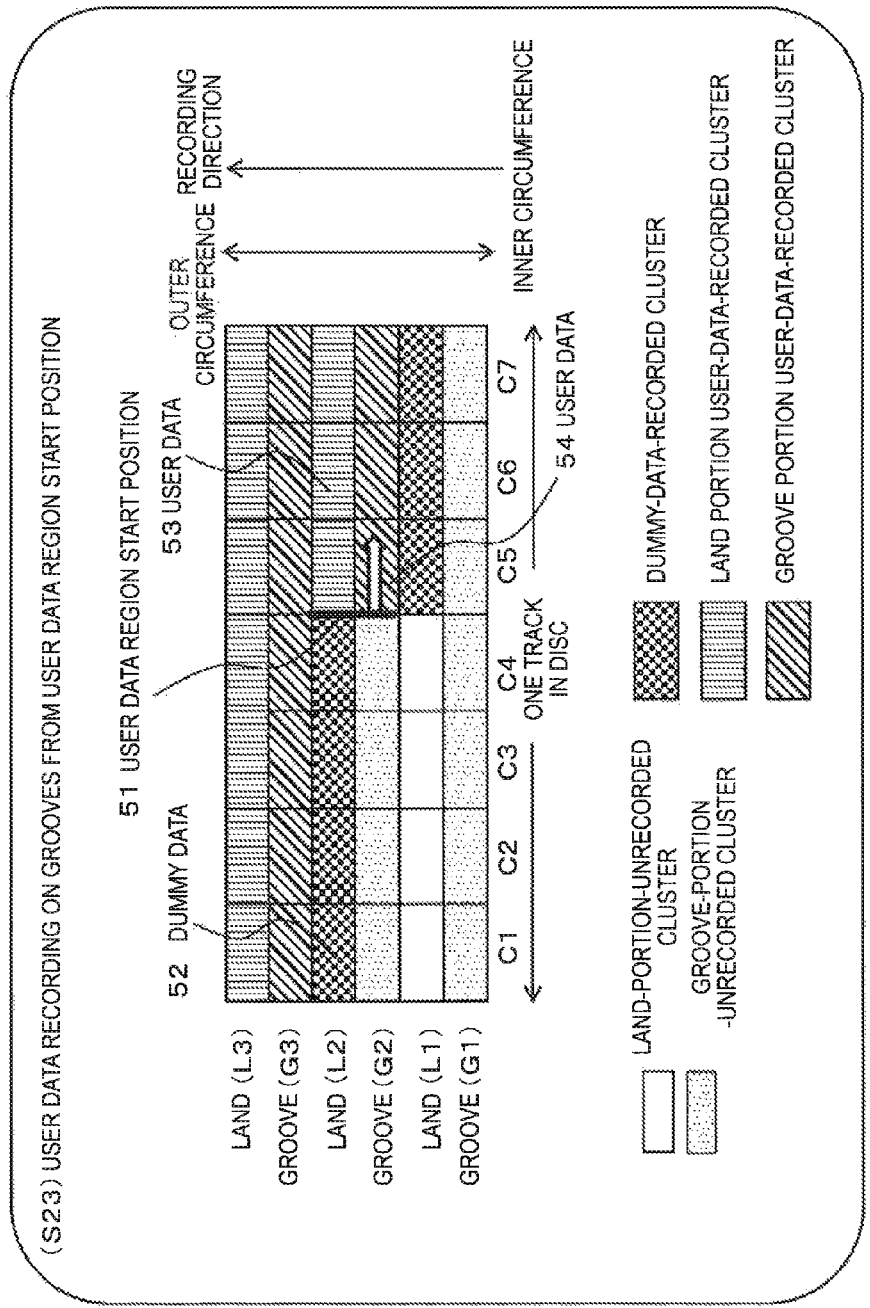
FIG. 10 is a diagram for describing an embodiment in which error occurrence is prevented by dummy data recording and a process example at a user data region start position.

(Step S23) user data recording on the grooves from the user data region start position (FIG. 10)

(Step S21) dummy data recording for one land track before the user data region start position First, a process for "the dummy data recording for one land track before the user data region start position" which is performed as a preliminary process before recording of user data is started will be described with reference to FIG. 8.

In the process example, recording of user data is scheduled to start from the user data region start position 51 illustrated in FIG. 8. The user data is scheduled to be recorded in a direction indicated by an arrow extending from the user data region start position 51 illustrated in the drawing. That is, recording of the user data starts from the cluster (C5) of the land (L2). Since the data recording is performed from the inner circumference to the outer circumstance of the disc, the user data is recorded on clusters (C5 to C7) of the land (L2) and the user data is subsequently recorded on the clusters (C1 to C7) of the land (L3).

In step S21, dummy data equivalent to one track in a disc before the user data region start position 51 is recorded before the process of recording the user data.

Dummy data 52 is illustrated in FIG. 8.

As illustrated in FIG. 8, the dummy data is recorded on the clusters (C5 to C7) of the land (L1) and clusters (C1 to C4) of the land (L2). The recording regions of the dummy data 52 are equivalent to one track in a disc.

Also, when the dummy data 52 is recorded, the grooves on both sides of a land on which the dummy data 52 is recorded are all in a data-unrecorded state and the dummy data 52 can be recorded through a correct tracking process.

In this way, in step S21, the dummy data equivalent to one track in a disc is recorded on the land before the user data region start position 51 which is a recording start point of the user data.

(Step S22)

After the dummy data recording process in step S21, a process of step S22 illustrated in FIG. 9 is performed.

The process of step S22 is a user data recording process from the user data region start position 51.

User data 53 is recorded in a direction indicated by an arrow extending from the user data region start position 51 of the land (L2) illustrated in FIG. 9. That is, recording of the user data starts from the cluster (C5) of the land (L2), the user data is recorded on the clusters (C5 to C7) of the land (L2), and the user data 53 is subsequently recorded on clusters (C1 to C7) of the land (L3).

When the user data 53 is recorded on the lands (L2 and L3), both grooves on both sides of each land on which the user data 53 is recorded are in a data-unrecorded state and the user data 53 can be recorded through a correct tracking process.

(Step S23)

After the process of recording the user data 53 on the lands in step S22, the process of step S23 illustrated in FIG. 10 is performed.

The process of step S23 is a process of recording user data on grooves.

User data 54 is recorded in a direction indicated by an arrow extending from the user data region start position 51 of the groove (G2) illustrated in FIG. 10. That is, recording of the user data starts from the cluster (C5) of the groove (G2), the user data is recorded on the clusters (C5 to C7) of the groove (G2), and the user data 54 is subsequently recorded on clusters (C1 to C7) of the groove (G3).

When user data 54 is recorded on the grooves (G2 and G3), the lands on both sides of each groove on which the user data 54 is recorded are all in a data-recorded state and the user data 54 can be recorded through a correct tracking process.

That is, both sides of the clusters (C5 to C7) of the groove (G2) on which the user data 54 is recorded are clusters which are interposed between the following clusters and in which data is recorded on the lands on both sides:

the clusters (C5 to C7) of the land (L1) which are the clusters on which the dummy data is recorded; and the clusters (C5 to C7) of the land (L2) which are the clusters on which the user data 53 is recorded.

In addition, both sides of the clusters (C1 to C7) of the groove (G3) on which the user data 54 is recorded are clusters which are interposed between the following clusters and in which data is recorded on the lands on both sides:

the clusters (C1 to C7) of the land (L2) which are the clusters on which the dummy data and the user data 53 are recorded; and the clusters (C1 to C7) of the land (L3) which are the clusters on which the user data 53 is recorded.

On the groove interposed by the lands in a state in which the states of both sides are the same data-recorded state, that is, the data-recorded state, the correct tracking process is possible, as described above with reference to FIG. 3 and the user data 54 can correctly be recorded without occurrence of a writing error.

As described above, the process of recording the user data on the lands and the grooves from the user data region start position can be performed through the processes of steps S21 to S23 in FIGS. 8 to 10 without occurrence of an error.

In Process Example 2 in which the user data recording is performed from the user data region start position, the dummy data is recorded in a land region equivalent to one track in the land portion before the user data region start position as the preliminary process.

Through the dummy data recording process, an error is set not to occur when the user data is recorded on the grooves.

That is, through the recording of the dummy data 52, the lands on both sides of the groove can be set to be in the same data-recorded state when the user data is recorded on the groove from the user data region start position 51. Thus, the user data 54 can correctly be recorded on the groove without occurrence of an error.

Also, in the disc configuration described above with reference to FIG. 4, the spare regions are set in the adjacent regions of the user data region.

In the process example described with reference to FIGS. 8 to 10, dummy data is also recorded in the spare regions.

Figure 11:
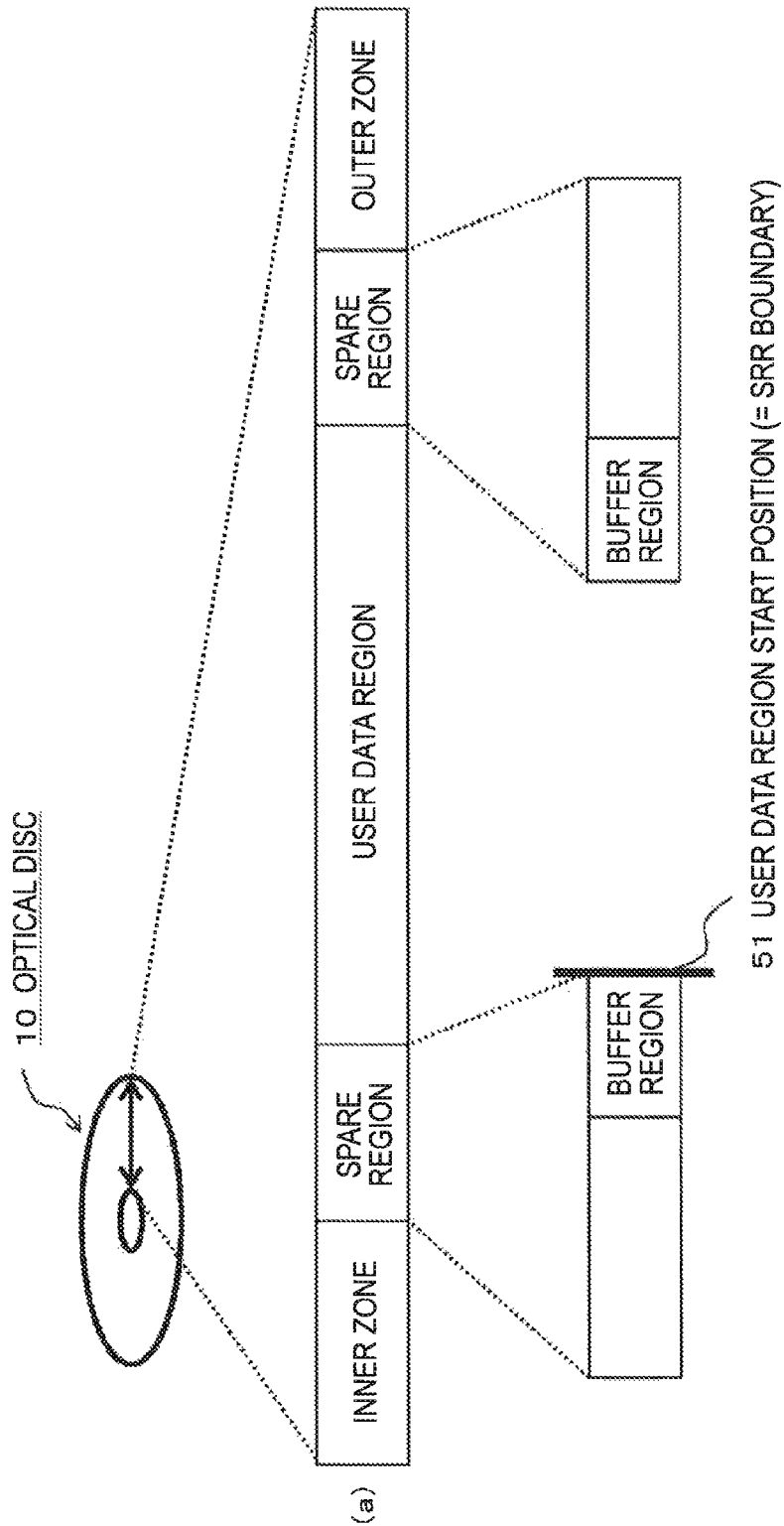
FIG. 11 is a diagram for describing an example in which a buffer region is configured in a spare region.

To ensure recording regions of the dummy data, for example, as illustrated in FIG. 11, partial regions of the spare regions may be set as buffer regions.

In the disc configuration illustrated in FIG. 11, buffer regions are formed in user data region adjacent portions of the spare regions. The buffer regions are configured to be ensured in advance as dummy data regions.

When the spare regions are freely used, there is a possibility of some data being also written on the spare regions adjacent to user data recording regions. In this case, dummy data may be unrecorded in a region in which data recording is performed, and thus there is a possibility of the foregoing Process Example 2 or Process Example 1 not being applicable.

To avoid such a matter, as illustrated in FIG. 11, buffer regions for dummy data recording are ensured in advance in the spare regions. In this setting, the buffer regions adjacent to the user data recording regions can be used as dummy data recording regions.

2-1-3. (Process Example 3) Process Example at Spare Region Start Position

Next, a process example at a spare region start position will be described with reference to FIG. 12 and the subsequent drawings.

As described with reference to FIG. 4, the spare regions are used as alternative regions of error clusters occurring in the user data regions and are set in the inner circumference and the outer circumference of the disc.

Figure 12:
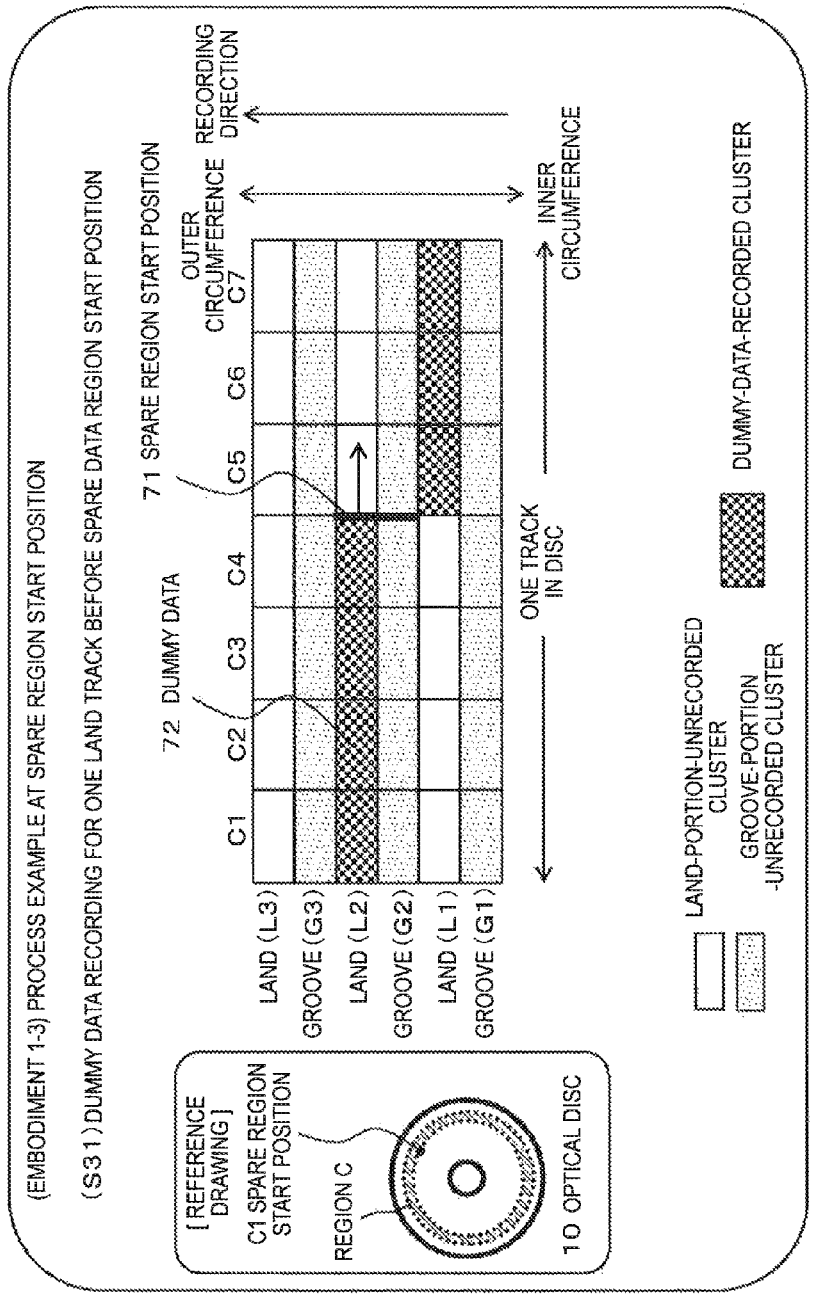
FIG. 12 is a diagram for describing an embodiment in which error occurrence is prevented by dummy data recording and a process example at a spare region start position.

A reference drawing in FIG. 12 illustrates a region C formed by parts of the spare regions on the outer circumference side of the optical disc 10. Also, the same process can also be performed in the spare regions on the inner circumference side.

In the reference drawing, the region C includes a spare region start position C1 equivalent to a boundary between the user data region and the spare region.

FIG. 12 illustrates a detailed configuration of the region C, that is, a land and groove configuration from the inner circumference to the outer circumference of the disc in the region C.

A spare region start position 71 indicated in a land and groove configuration of FIG. 12 corresponds to a spare region start position C1 in the reference drawing.

FIG. 12 illustrates a cluster configuration of data recording portions of the groove (G1), the land (L1), the groove (G2), the land (L2), a groove (G3), and the land (L3) from the inner circumference side to the outer circumference side of the disc in the region C.

One rectangular region corresponds to one cluster (64 KB).

The vertical direction is equivalent to a radial direction of the disc, the lower side is the inner circumference portion of the disc, and the upper side is the outer circumference portion of the disc. A left end to a right end is equivalent to one track in a disc.

A data recording process is performed individually in groove and land portions. In addition, a data recording direction is directed from the left to the right and is directed from the inner circumference side (the lower side) to the outer circumference side (the upper side).

(Process Example 3) A process example at a spare region start position is a process example when data recording starts from a start position of a spare region.

Also, a recording process sequence of the embodiment example to be described below is a process example in which recording of the lands (L) is antecedently performed and recording of the grooves (G) is subsequently performed. However, this is merely an example, and the process according to the present disclosure can also be applied as a process in which recording of the grooves (G) is antecedently performed and recording of the lands (L) is subsequently performed. The same error prevention effect can be obtained.

(Process Example 3) A process of causing a recording error not to occur in data recording from the spare region start position will be described.

Three chronological process steps (steps S31 to S33) will be described in order with reference to FIGS. 12 to 14. Also, before step S31 is performed, both the lands and the grooves in the region C are assumed to be in a data-unrecorded state. That is, all the clusters that form the groove (G1) to the land (L3) illustrated in FIG. 12 are assumed to be configured as land-portion-unrecorded clusters and groove-portion-unrecorded clusters.

The following three chronological process steps (steps S31 to S33) will be described in order with reference to FIGS. 12 to 14:

(Step S31) dummy data recording for one land track before the spare region start position (FIG. 12)
(Step S32) user data recording on the lands from the spare region start position (FIG. 13)
(Step S33) user data recording on the grooves from the spare region start position (FIG. 14)
(Step S31) Dummy Data Recording for One Land Track Before the Spare Region Start Position First, a process for "the dummy data recording for one land track before the spare region start position" which is performed on the spare region as a preliminary process before data recording is started will be described with reference to FIG. 12.

In the process example, data recording is scheduled to start from the spare region start position 71 illustrated in FIG. 12. The user data is scheduled to be recorded in a direction indicated by an arrow extending from the spare region start position 71 illustrated in the drawing. That is, the data recording starts from the cluster (C5) of the land (L2). Since the data recording is performed from the inner circumference to the outer circumstance of the disc, the data is recorded on clusters (C5 to C7) of the land (L2) and the data is subsequently recorded on the clusters (C1 to C7) of the land (L3).

In step S31, dummy data equivalent to one track in a disc before the spare region start position 71 is recorded before data recording process.

Dummy data 72 is illustrated in FIG. 12.

As illustrated in FIG. 12, the dummy data is recorded on the clusters (C5 to C7) of the land (L1) and clusters (C1 to C4) of the land (L2). The recording regions of the dummy data 72 are equivalent to one track in a disc.

Also, when the dummy data 72 is recorded, the grooves on both sides of a land on which the dummy data 72 is recorded are all in a data-unrecorded state and the dummy data 72 can be recorded through a correct tracking process.

In this way, in step S31, the dummy data equivalent to one track in a disc is recorded on the land before the spare region start position 71 which is a recording start point of the data.

(Step S32)

Figure 13:
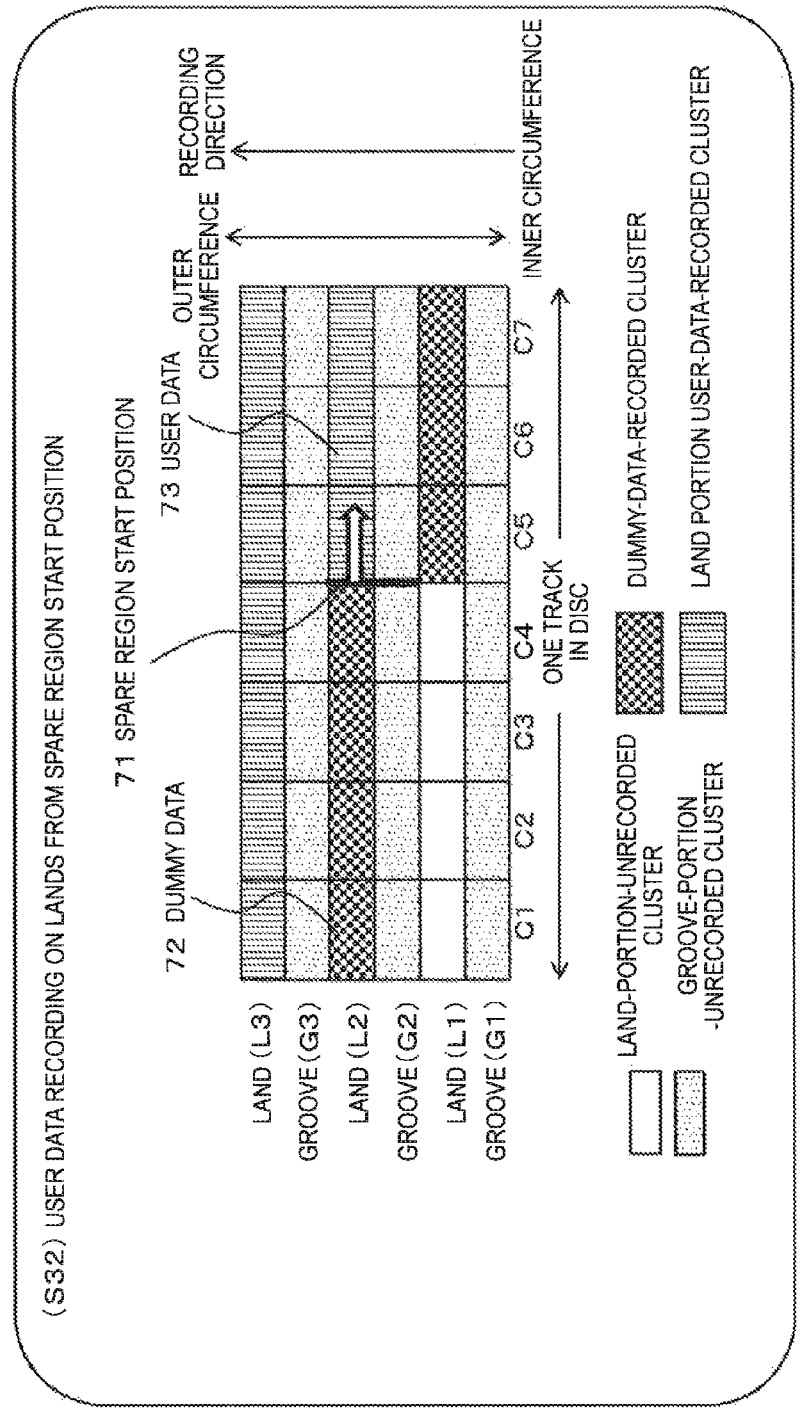
FIG. 13 is a diagram for describing an embodiment in which error occurrence is prevented by dummy data recording and a process example at a spare region start position.

After the dummy data recording process in step S31, a process of step S32 illustrated in FIG. 13 is performed.

The process of step S32 is a data recording process from the spare region start position 71.

Data in a direction indicated by an arrow extending from the spare region start position 71 of the land (L2) illustrated in FIG. 13, for example, alternative user data 73 unrecordable in the user data recording region, is recorded. That is, recording of the user data starts from the cluster (C5) of the land (L2), the user data is recorded on the clusters (C5 to C7) of the land (L2), and the user data 73 is subsequently recorded on clusters (C1 to C7) of the land (L3).

When the user data 73 is recorded on the lands (L2 and L3), both grooves on both sides of each land on which the user data 73 is recorded are in a data-unrecorded state and the user data 73 can be recorded through a correct tracking process.

(Step S33)

Figure 14:
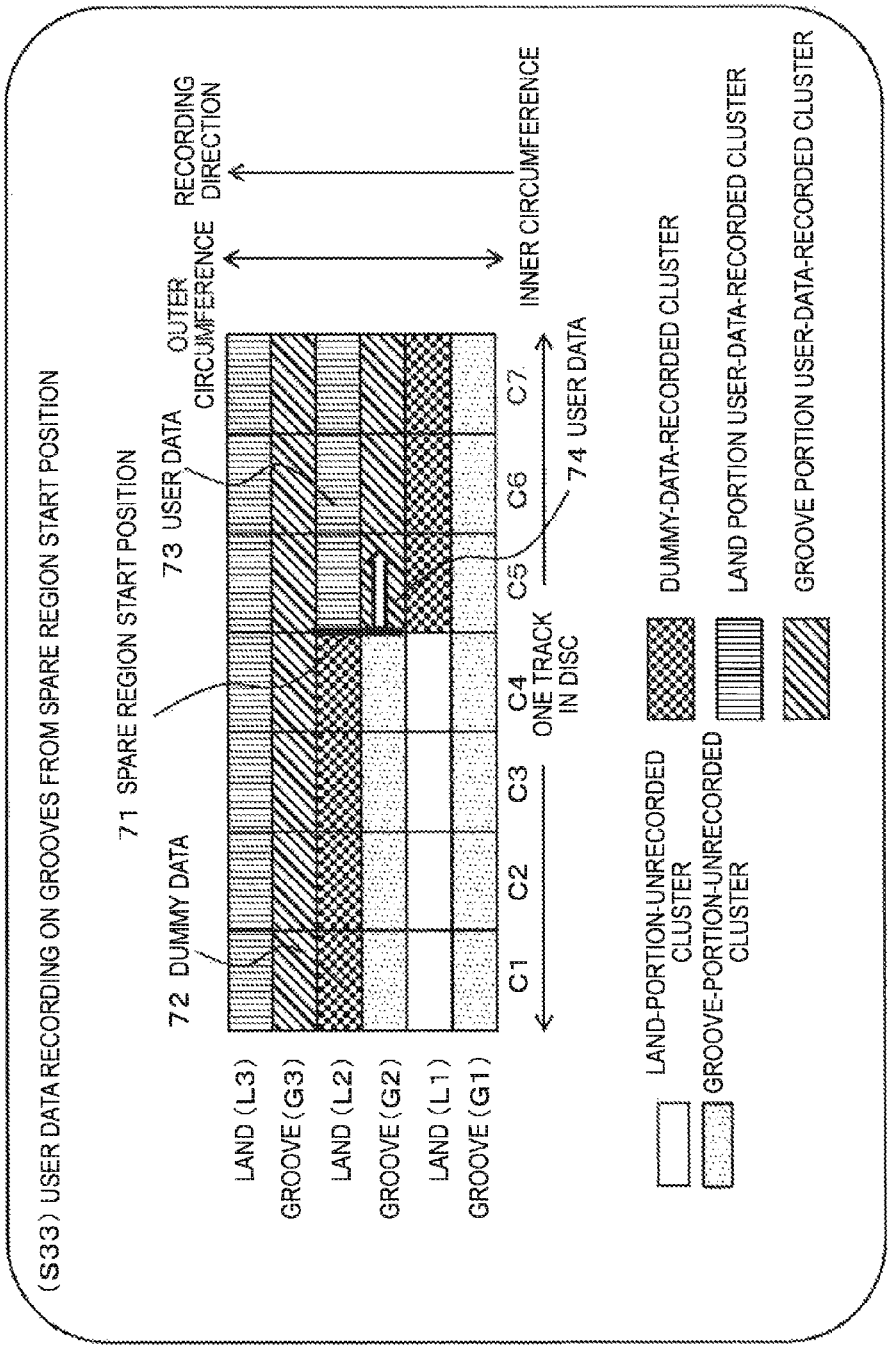
FIG. 14 is a diagram for describing an embodiment in which error occurrence is prevented by dummy data recording and a process example at a spare region start position.

After the process of recording the user data 73 on the lands in step S32, the process of step S33 illustrated in FIG. 14 is performed.

The process of step S33 is a process of recording user data on grooves.

User data 74 is recorded in a direction indicated by an arrow extending from the spare region start position 71 of the groove (G2) illustrated in FIG. 14. That is, recording of the user data starts from the cluster (C5) of the groove (G2), the user data is recorded on the clusters (C5 to C7) of the groove (G2), and the user data 74 is subsequently recorded on clusters (C1 to C7) of the groove (G3).

When user data 74 is recorded on the grooves (G2 and G3), the lands on both sides of each groove on which the user data 74 is recorded are all in a data-recorded state and the user data 74 can be recorded through a correct tracking process.

That is, both sides of the clusters (C5 to C7) of the groove (G2) on which the user data 74 is recorded are clusters which are interposed between the following clusters and in which data is recorded on the lands on both sides:

the clusters (C5 to C7) of the land (L1) which are the clusters on which the dummy data is recorded; and the clusters (C5 to C7) of the land (L2) which are the clusters on which the user data 73 is recorded.

In addition, both sides of the clusters (C1 to C7) of the groove (G3) on which the user data 74 is recorded are clusters which are interposed between the following clusters and in which data is recorded on the lands on both sides:

the clusters (C1 to C7) of the land (L2) which are the clusters on which the dummy data and the user data 73 are recorded; and the clusters (C1 to C7) of the land (L3) which are the clusters on which the user data 73 is recorded.

On the groove interposed by the lands in a state in which the states of both sides are the same data-recorded state, that is, the data-recorded state, the correct tracking process is possible, as described above with reference to FIG. 3 and the user data 74 can correctly be recorded without occurrence of a writing error.

As described above, the process of recording the user data on the lands and the grooves from the spare region start position can be performed through the processes of steps S31 to S33 in FIGS. 12 to 14 without occurrence of an error.

In Process Example 3 in which the user data recording is performed from the spare region start position, the dummy data is recorded in a land region equivalent to one track in the land portion before the spare region start position as the preliminary process.

Through the dummy data recording process, an error is set not to occur when the user data is recorded on the grooves.

That is, through the recording of the dummy data 72, the lands on both sides of the groove can be set to be in the same data-recorded state when the user data is recorded on the groove from the spare region start position 71. Thus, the user data 74 can correctly be recorded on the groove without occurrence of an error.

2-1-4. (Process Example 4) Process Example in Defect Cluster Region Skip Destination Next, a process example in a defect cluster region skip destination will be described with reference to FIG. 15 and the subsequent drawing.

A defect cluster region in which data is unrecordable occurs in some cases in the disc configuration described with reference to FIG. 4. For example, when a defect cluster region occurs in a user data region, the defect cluster region is skipped and jumped to a cluster in which data recording is possible to continue recording of data.

Also, defect cluster information is recorded as management data in the disc.

The process example is a process example when a process of skipping the defect cluster region in this way is performed.

Figure 15:
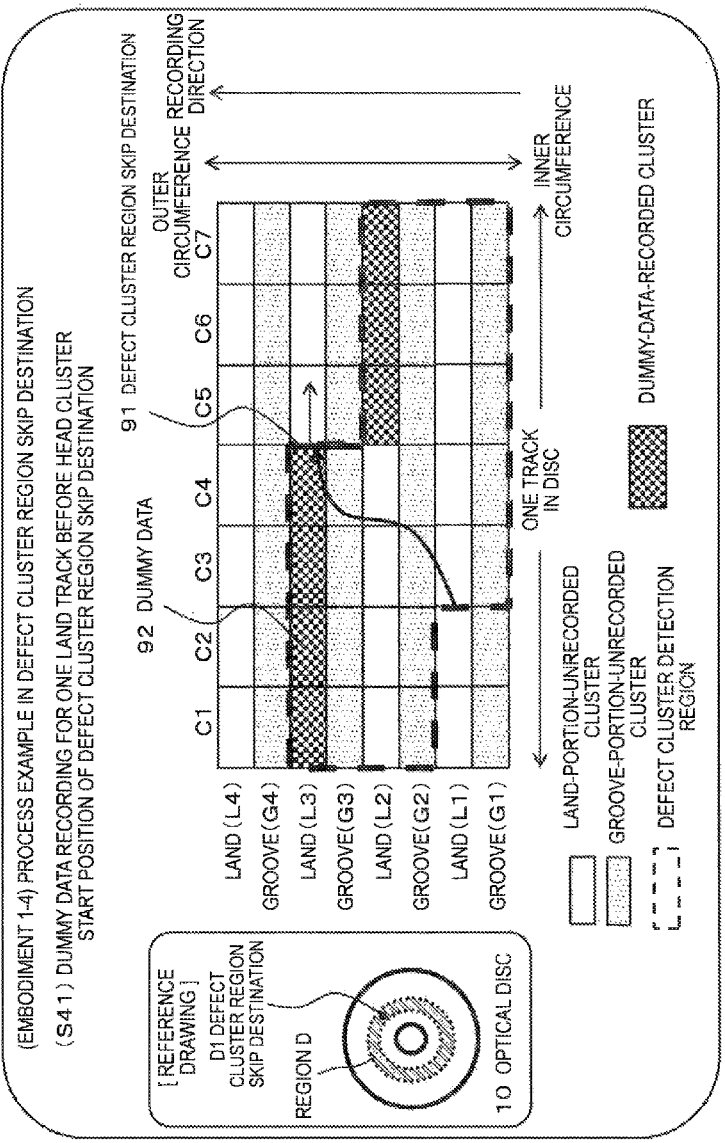
FIG. 15 is a diagram for describing an embodiment in which error occurrence is prevented by dummy data recording and a process example when defect cluster region skipping is performed.

A reference drawing in FIG. 15 illustrates a region D formed by a part of a user data region of the optical disc 10.

The region D of the reference drawing is a part of the user data region including a defect cluster region and includes a defect cluster region skip destination D1.

FIG. 15 illustrates a detailed configuration of the region D, that is, a land and groove configuration from the inner circumference to the outer circumference of the disc in the region D.

A defect cluster region skip destination 91 indicated in the land and groove configuration of FIG. 15 corresponds to a defect cluster region skip destination D1 in the reference drawing.

FIG. 15 illustrates a cluster configuration of data recording portions of the groove (G1), the land (L1), the groove (G2), the land (L2), a groove (G3), and the land (L3) from the inner circumference side to the outer circumference side of the disc in the region D.

One rectangular region corresponds to one cluster (64 KB).

The vertical direction is equivalent to a radial direction of the disc, the lower side is the inner circumference portion of the disc, and the upper side is the outer circumference portion of the disc. A left end to a right end is equivalent to one track in a disc.

A data recording process is performed individually in groove and land portions. In addition, a data recording direction is directed from the left to the right and is directed from the inner circumference side (the lower side) to the outer circumference side (the upper side).

(Process Example 4) A process example in a defect cluster region skip destination is a process example when data recording is started from a start position of a spare region.

Also, a recording process sequence of the embodiment example to be described below is a process example in which recording of the lands (L) is antecedently performed and recording of the grooves (G) is subsequently performed. However, this is merely an example, and the process according to the present disclosure can also be applied as a process in which recording of the grooves (G) is antecedently performed and recording of the lands (L) is subsequently performed. The same error prevention effect can be obtained.

(Process Example 4) A process of causing a recording error not to occur in data recording from the defect cluster region skip destination will be described.

Three chronological process steps (steps S41 to S43) will be described in order with reference to FIGS. 15 to 17. Also, before step S41 is performed, both the lands and the grooves in the region D are assumed to be in a data-unrecorded state. That is, all the clusters that form the groove (G1) to the land (L3) illustrated in FIG. 15 are assumed to be configured as land-portion-unrecorded clusters and groove-portion-unrecorded clusters.

The following three chronological process steps (steps S41 to S43) will be described in order with reference to FIGS. 15 to 17:

(Step S41) dummy data recording for one land track before the defect cluster region skip destination (FIG. 15)

Figure 16:
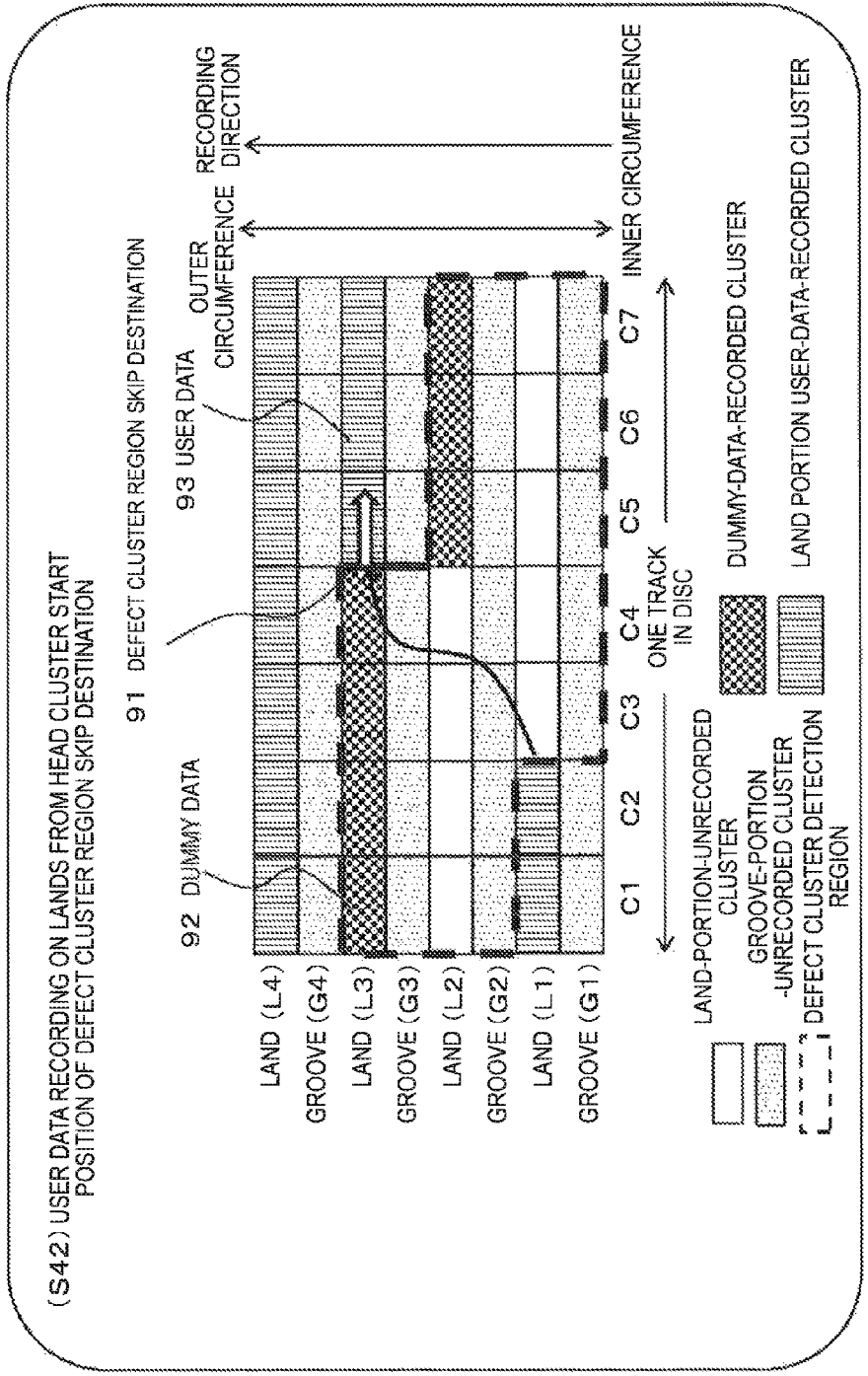
FIG. 16 is a diagram for describing an embodiment in which error occurrence is prevented by dummy data recording and a process example when defect cluster region skipping is performed.

(Step S42) user data recording on the lands from the defect cluster region skip destination (FIG. 16)

Figure 17:
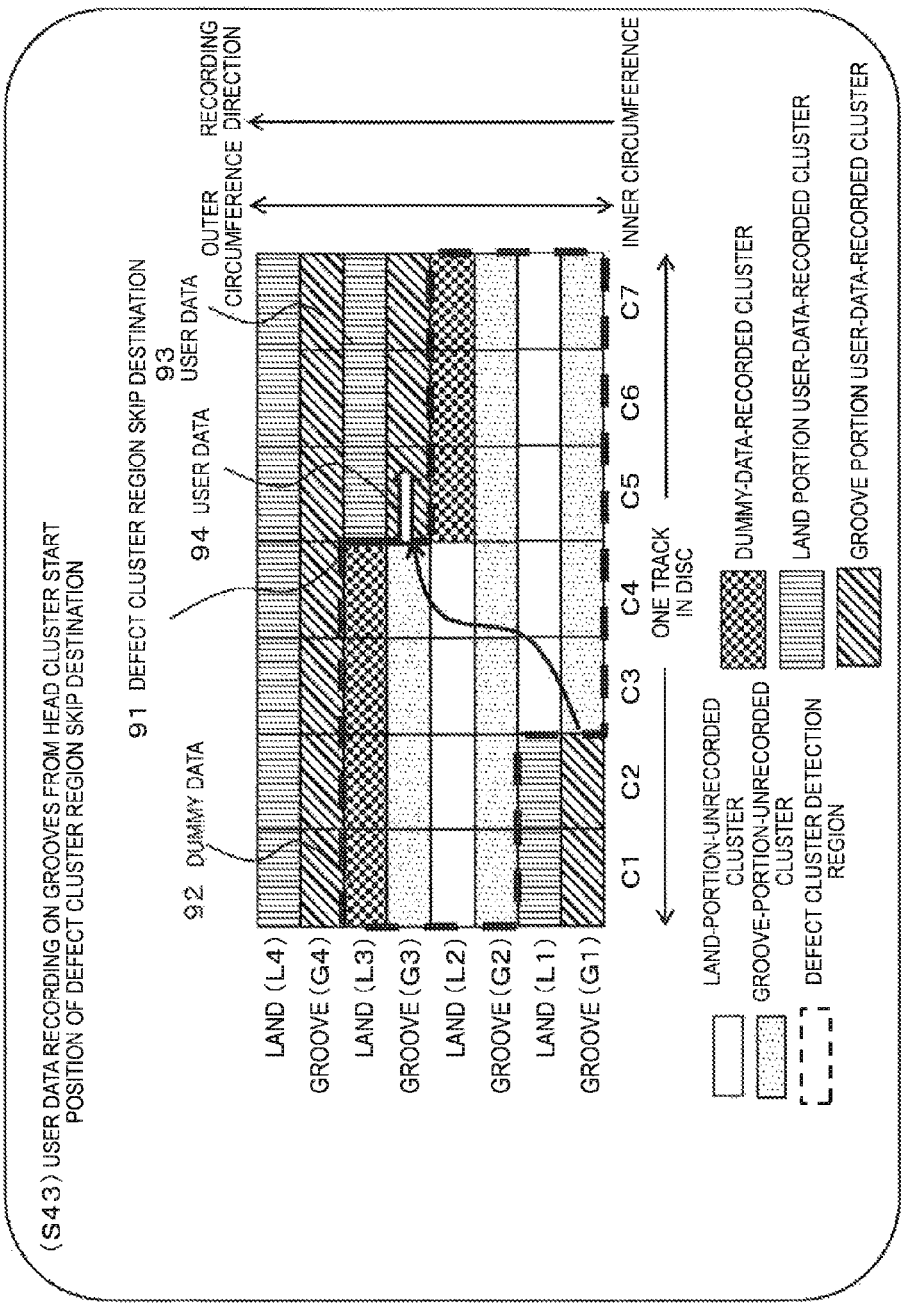
FIG. 17 is a diagram for describing an embodiment in which error occurrence is prevented by dummy data recording and a process example when defect cluster region skipping is performed.

(Step S43) user data recording on the grooves from the defect cluster region skip destination (FIG. 17)

(Step S41) dummy data recording for one land track before the defect cluster region skip destination First, a process for "the dummy data recording for one land track before the defect cluster region skip destination" which is performed on a defect cluster region skip destination as a preliminary process before data recording is started will be described with reference to FIG. 15.

In the process example, data recording is scheduled to start from a defect cluster region skip destination 91 illustrated in FIG. 15. The data is scheduled to be recorded in a direction indicated by an arrow extending from the defect cluster region skip destination 91 illustrated in the drawing. That is, the data recording starts from the cluster (C5) of the land (L2). Since the data recording is performed from the inner circumference to the outer circumstance of the disc, the data is recorded on clusters (C5 to C7) of the land (L2) and the data is subsequently recorded on the clusters (C1 to C7) of the land (L3).

In step S41, dummy data equivalent to one track before the defect cluster region skip destination 91 is recorded before the data recording process.

Dummy data 92 is illustrated in FIG. 15.

As illustrated in FIG. 15, the dummy data is recorded on the clusters (C5 to C7) of the land (L1) and clusters (C1 to C4) of the land (L2). The recording regions of the dummy data 92 are equivalent to one track in a disc.

Also, when the dummy data 92 is recorded, the grooves on both sides of a land on which the dummy data 92 is recorded are all in a data-unrecorded state and the dummy data 92 can be recorded through a correct tracking process.

In this way, in step S41, the dummy data equivalent to one track is recorded on the land before the defect cluster region skip destination 91 which is a data recording start point.
(Step S42)

After the dummy data recording process in step S41, a process of step S42 illustrated in FIG. 16 is performed.

The process of step S42 is a data recording process from the defect cluster region skip destination 91.

Data in a direction indicated by an arrow extending from the defect cluster region skip destination 91 of the land (L2) illustrated in FIG. 16, for example, user data 93, is recorded. That is, recording of the user data starts from the cluster (C5) of the land (L2), the user data is recorded on the clusters (C5 to C7) of the land (L2), and the user data 93 is subsequently recorded on clusters (C1 to C7) of the land (L3).

When the user data 93 is recorded on the lands (L2 and L3), both grooves on both sides of each land on which the user data 93 is recorded are in a data-unrecorded state and the user data 93 can be recorded through a correct tracking process.
(Step S43)

After the process of recording the user data 93 on the lands in step S42, the process of step S43 illustrated in FIG. 17 is performed.

The process of step S43 is a process of recording user data on grooves.

User data 94 is recorded in a direction indicated by an arrow extending from the defect cluster region skip destination 91 of the groove (G2) illustrated in FIG. 17. That is, recording of the user data starts from the cluster (C5) of the groove (G2), the user data is recorded on the clusters (C5 to C7) of the groove (G2), and the user data 94 is subsequently recorded on clusters (C1 to C7) of the groove (G3).

When user data 94 is recorded on the grooves (G2 and G3), the lands on both sides of each groove on which the user data 94 is recorded are all in a data-recorded state and the user data 94 can be recorded through a correct tracking process.

That is, both sides of the clusters (C5 to C7) of the groove (G2) on which the user data 94 is recorded are clusters which are interposed between the following clusters and in which data is recorded on the lands on both sides:

the clusters (C5 to C7) of the land (L1) which are the clusters on which the dummy data is recorded; and the clusters (C5 to C7) of the land (L2) which are the clusters on which the user data 93 is recorded.

In addition, both sides of the clusters (C1 to C7) of the groove (G3) on which the user data 94 is recorded are clusters which are interposed between the following clusters and in which data is recorded on the lands on both sides:

the clusters (C1 to C7) of the land (L2) which are the clusters on which the dummy data and the user data 93 are recorded; and the clusters (C1 to C7) of the land (L3) which are the clusters on which the user data 93 is recorded.

On the groove interposed by the lands in a state in which the states of both sides are the same data-recorded state, that is, the data-recorded state, the correct tracking process is possible, as described above with reference to FIG. 3 and the user data 94 can correctly be recorded without occurrence of a writing error.

As described above, the process of recording the user data on the lands and the grooves from defect cluster region skip destination can be performed through the processes of steps S41 to S43 in FIGS. 15 to 17 without occurrence of an error.

In Process Example 4 in which the user data recording is performed from the defect cluster region skip destination, the dummy data is recorded in a land region equivalent to one track in the land portion before the defect cluster region skip destination as the preliminary process.

Through the dummy data recording process, an error is set not to occur when the user data is recorded on the grooves.

That is, through the recording of the dummy data 92, the lands on both sides of the groove can be set to be in the same data-recorded state when the user data is recorded on the groove from the defect cluster region skip destination 91. Thus, the user data 94 can correctly be recorded on the groove without occurrence of an error.

2-2. (Embodiment 2) Embodiment in which Occurrence of Error is Prevented by Recording Skipping of Adjacent Cluster of Defect Cluster Next, an embodiment in which occurrence of an error is prevented by recording skipping of an adjacent cluster of a defect cluster will be described as Embodiment 2 with reference to FIG. 18 and the subsequent drawings.

As described in the above-described Embodiment 1 (Process Example 4), a defect cluster occurs in a data recording region of the disc in some cases. For example, when a defect cluster region occurs in a user data region, the defect cluster region is skipped and jumped to a cluster in which data recording is possible to perform recording of data.

Also, defect cluster information indicating the position or the like of a defect cluster is recorded as management data in the disc.

Embodiment 2 to be described below is an embodiment in which occurrence of an error is prevented by recording skipping of an adjacent cluster of a defect cluster.

Figure 18:
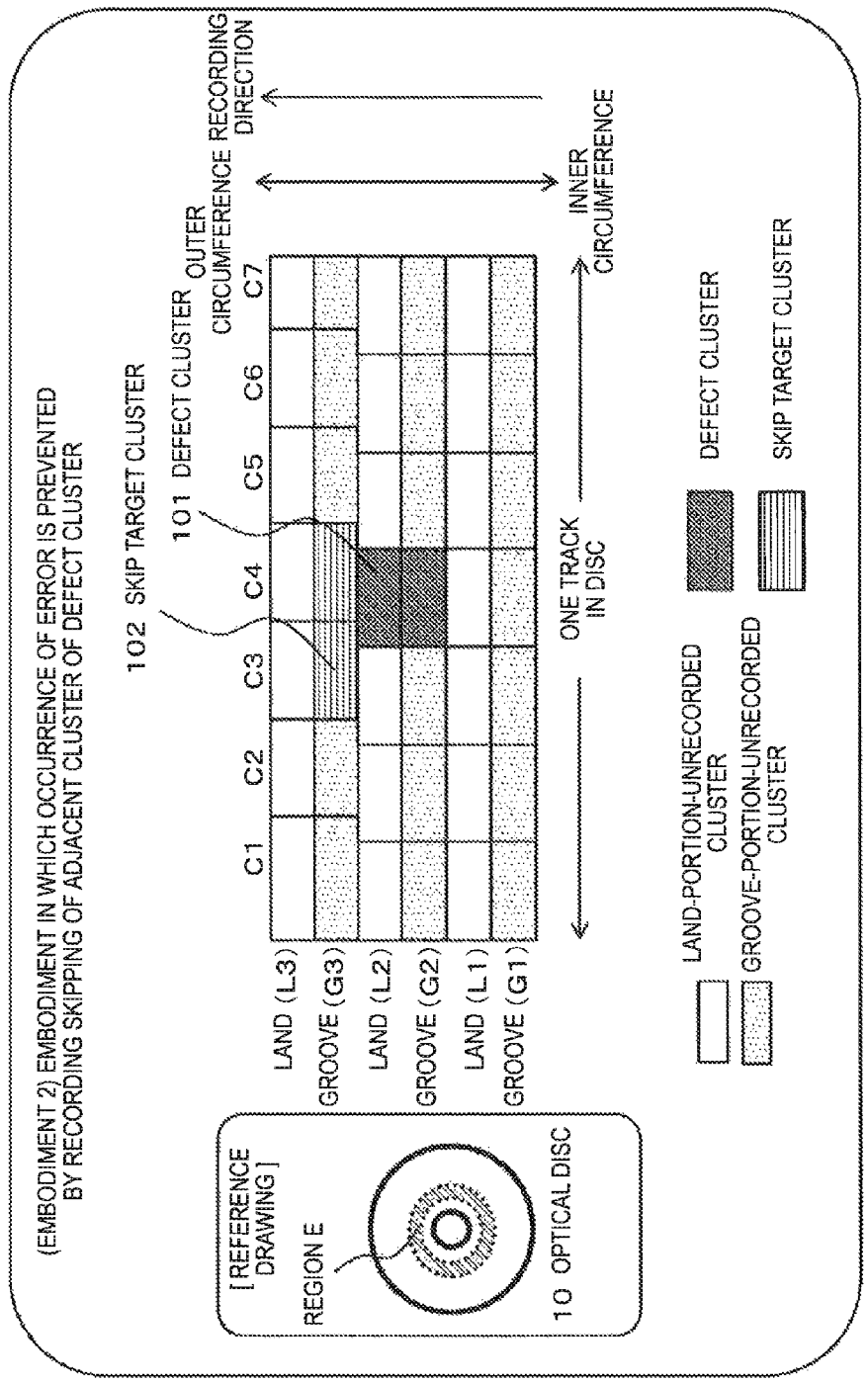
FIG. 18 is a diagram for describing an embodiment in which a defect cluster region is skipped.

A reference drawing in FIG. 18 illustrates a region E formed by a part of a user data region of the optical disc 10.

The region E of the reference drawing is a part of the user data region including a defect cluster region.

FIG. 18 illustrates a detailed configuration of the region E, that is, a land and groove configuration from the inner circumference to the outer circumference of the disc in the region E.

A defect cluster 101 is included in the land and groove configuration of FIG. 18. The defect cluster 101 is a cluster which is not used in data recording reproduction. Also, this information is recorded in management data and a device performing the data recording reproduction can comprehend the position of a defect cluster with reference to the management data.

FIG. 18 illustrates a cluster configuration of data recording portions of the groove (G1), the land (L1), the groove (G2), the land (L2), a groove (G3), and the land (L3) from the inner circumference side to the outer circumference side of the disc in the region E.

One rectangular region corresponds to one cluster (64 KB).

The vertical direction is equivalent to a radial direction of the disc, the lower side is the inner circumference portion of the disc, and the upper side is the outer circumference portion of the disc. A left end to a right end is equivalent to one track in a disc.

A data recording process is performed individually in groove and land portions. In addition, a data recording direction is directed from the left to the right and is directed from the inner circumference side (the lower side) to the outer circumference side (the upper side).

Embodiment 2 is an embodiment in which occurrence of an error is prevented by recording skipping of an adjacent cluster of a defect cluster.

Also, a recording process sequence of the embodiment example to be described below is a process example in which recording of the lands (L) is antecedently performed and recording of the grooves (G) is subsequently performed. However, this is merely an example, and the process according to the present disclosure can also be applied as a process in which recording of the grooves (G) is antecedently performed and recording of the lands (L) is subsequently performed. The same error prevention effect can be obtained.

Three chronological process steps (steps S51 to S53) will be described in order with reference to FIGS. 18 to 20. Also, before step S51 is performed, both the lands and the grooves in the region E are assumed to be in a data-unrecorded state. That is, all the clusters that form the groove (G1) to the land (L3) illustrated in FIG. 18 are assumed to be configured as land-portion-unrecorded clusters and groove-portion-unrecorded clusters. A part of them is the defect cluster 101.

In Embodiment 2, as illustrated in FIG. 18, normal clusters of a groove adjacent to the defect cluster 101 are set skip target clusters 102.

The skip target cluster 102 is a cluster which is skipped at the time of data recording without performing data recording.

The following two chronological process steps (steps S51 to S52) will be described in order with reference to FIGS. 19 to 20:

(Step S51) user data recording on lands (FIG. 19)
(Step S52) user data recording on grooves (FIG. 20)
(Step S51)

A process of step S51 is a data recording process on lands.

Figure 19:
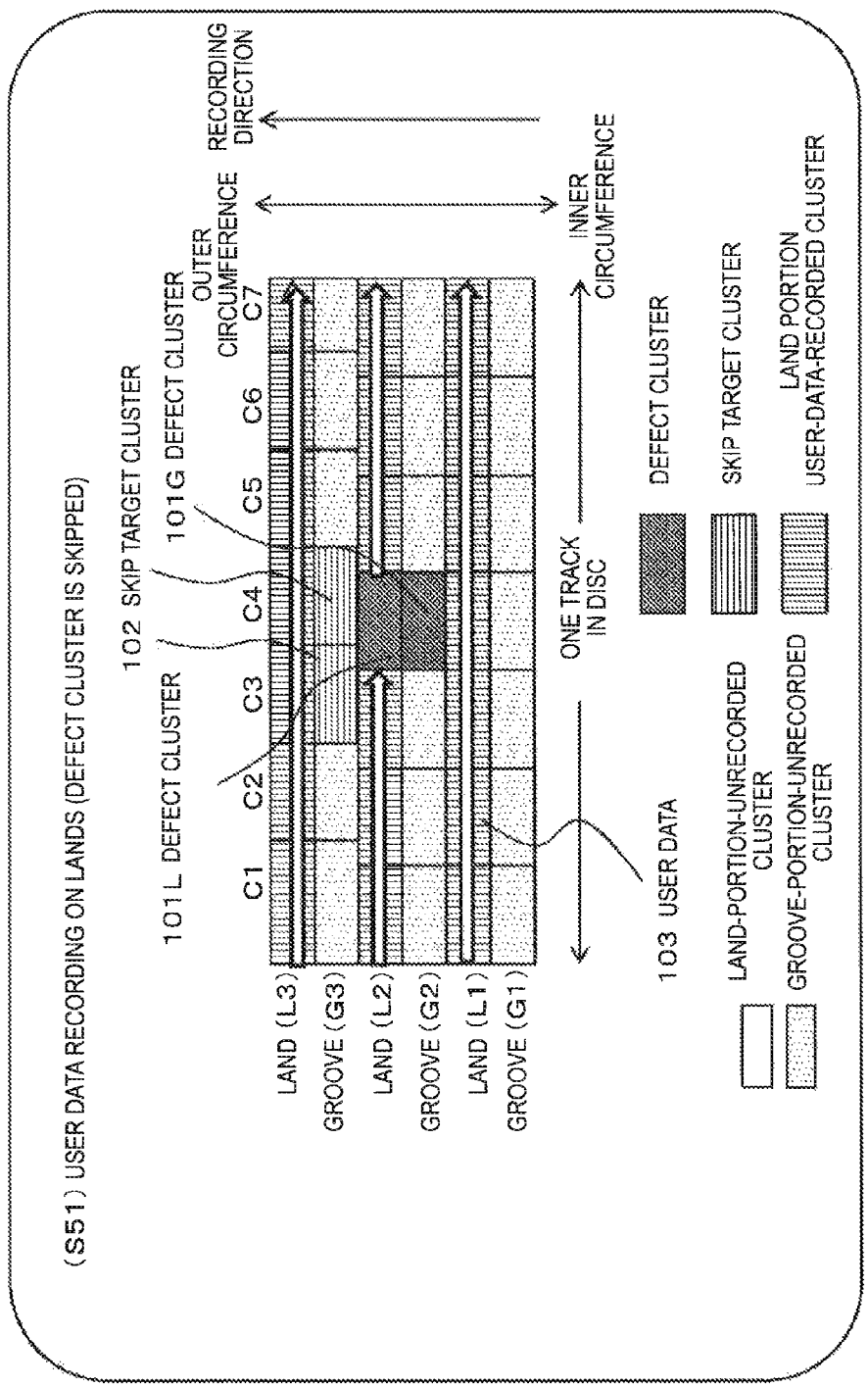
FIG. 19 is a diagram for describing an embodiment in which a defect cluster region is skipped.

As illustrated in FIG. 19, user data 103 is recoded in order on the land (L1) to the land (L3). Here, a defect cluster 101L of a land is skipped.

When the user data 103 is recorded on the lands (L1 to L3), both grooves on both sides of each land on which the user data 103 is recorded are in a data-unrecorded state and the user data 103 can be recorded through a correct tracking process.

(Step S52)

Figure 20:
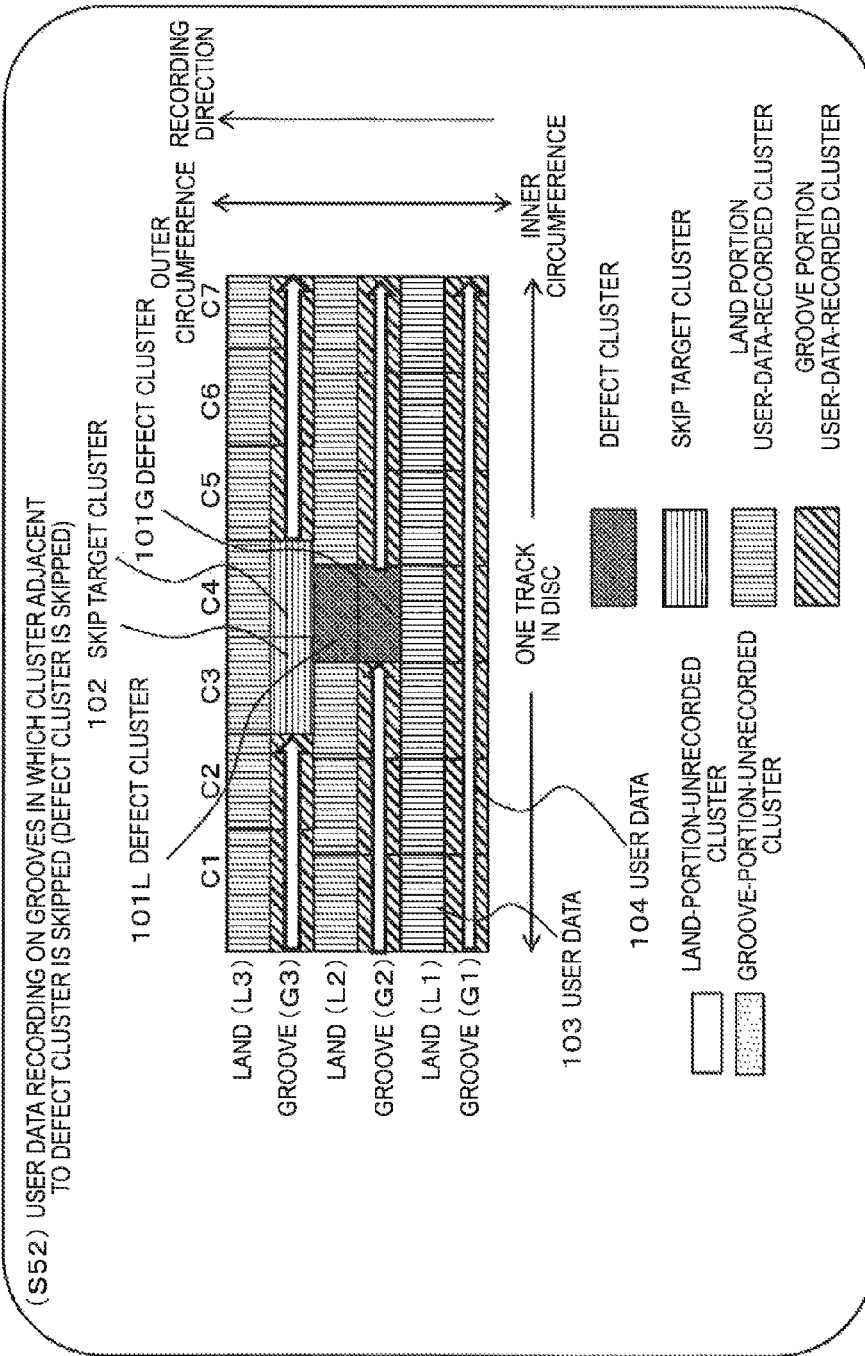
FIG. 20 is a diagram for describing an embodiment in which a defect cluster region is skipped.

After the process of recording the user data 103 on the lands in step S51, the process of step S52 illustrated in FIG. 20 is performed.

The process of step S52 is a process of recording user data on grooves.

As illustrated in FIG. 20, user data 104 is recorded in order on the groove (G1) to the groove (G3). Here, a defect cluster 101G of a groove is skipped.

Further, when a process of recording user data on the grooves is performed, a cluster of the groove (G3) adjacent to the defect cluster 101L of the land, that is, the skip target cluster 102 illustrated in FIG. 20, is also skipped and data recording is not performed.

The skip target clusters 102 of the groove (G3) are clusters C3 and C4 of the groove (G3). These clusters are set such that data recording states of the lands on both sides are different at the time of data recording on the groove (G3).

That is, the defect cluster 101L of the land (L2) is in a data-unrecorded state and the clusters (C3 and C4) of one-side land (L3) are in a data-recorded state.

When the clusters on both sides are in different data recording states, that is, the data-recorded cluster and the data-unrecorded cluster are combined, there is a possibility of tracking not being accurately performed. Thus, there is a high possibility of a recording error occurring.

To prevent such a recording error in advance, data recording is not performed on the skip target clusters 102 of the groove (G3) and a skipping process is performed.

Through the skipping process, data recording can reliably be performed on the grooves.

The clusters in which certain data is recordable in grooves other than the skip target clusters 102 of the groove (G3) are all configured by clusters in which data recording is finished on both sides and data is accurately recordable through a reliable tracking process, 2-3. (Embodiment 3) Embodiment in which Occurrence of Error is Prevented when Area Division Striping is Performed Next, an embodiment in which occurrence of an error is prevented when area division striping is performed will be described as Embodiment 3 with reference to FIG. 21 and the subsequent drawings.

The area division striping is a process in which data recording on the disc is performed using two or more pickups and the data recording on a plurality of different disc regions is performed as a parallel process.

Figure 21:
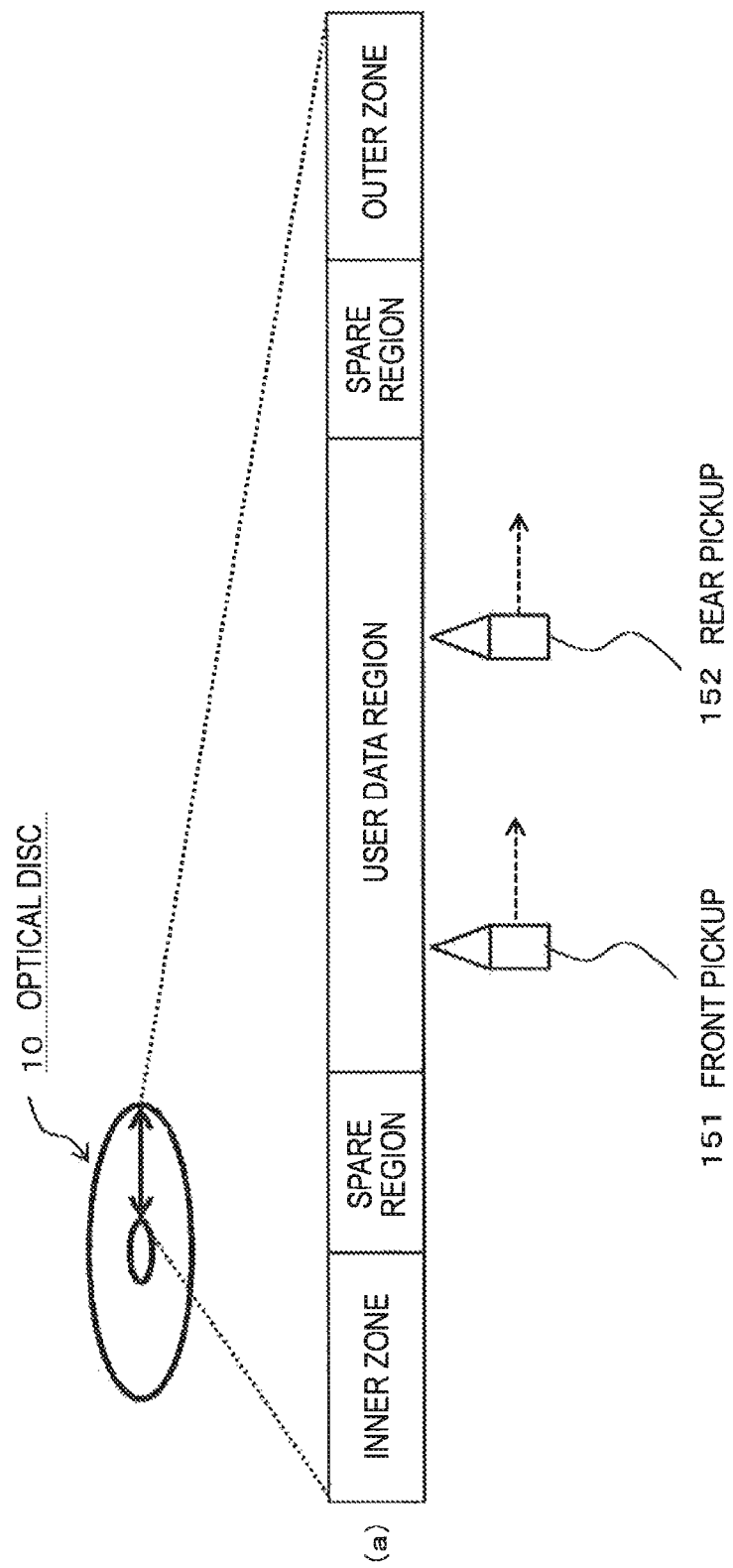
FIG. 21 is a diagram for describing area division striping.

For example, as illustrated in FIG. 21, the data recording is performed in parallel using two pickups, that is, a front pickup 151 and a rear pickup 152 in a user data region of the optical disc 10. Through the parallel recording process, a data recording speed can be improved.

Embodiment 3 to be described below is an embodiment when the area division striping which is the parallel recording process using the plurality of pickups is performed.

A data recording process sequence of Embodiment 3 will be described with reference to FIGS. 22 to 25.

Figure 22:
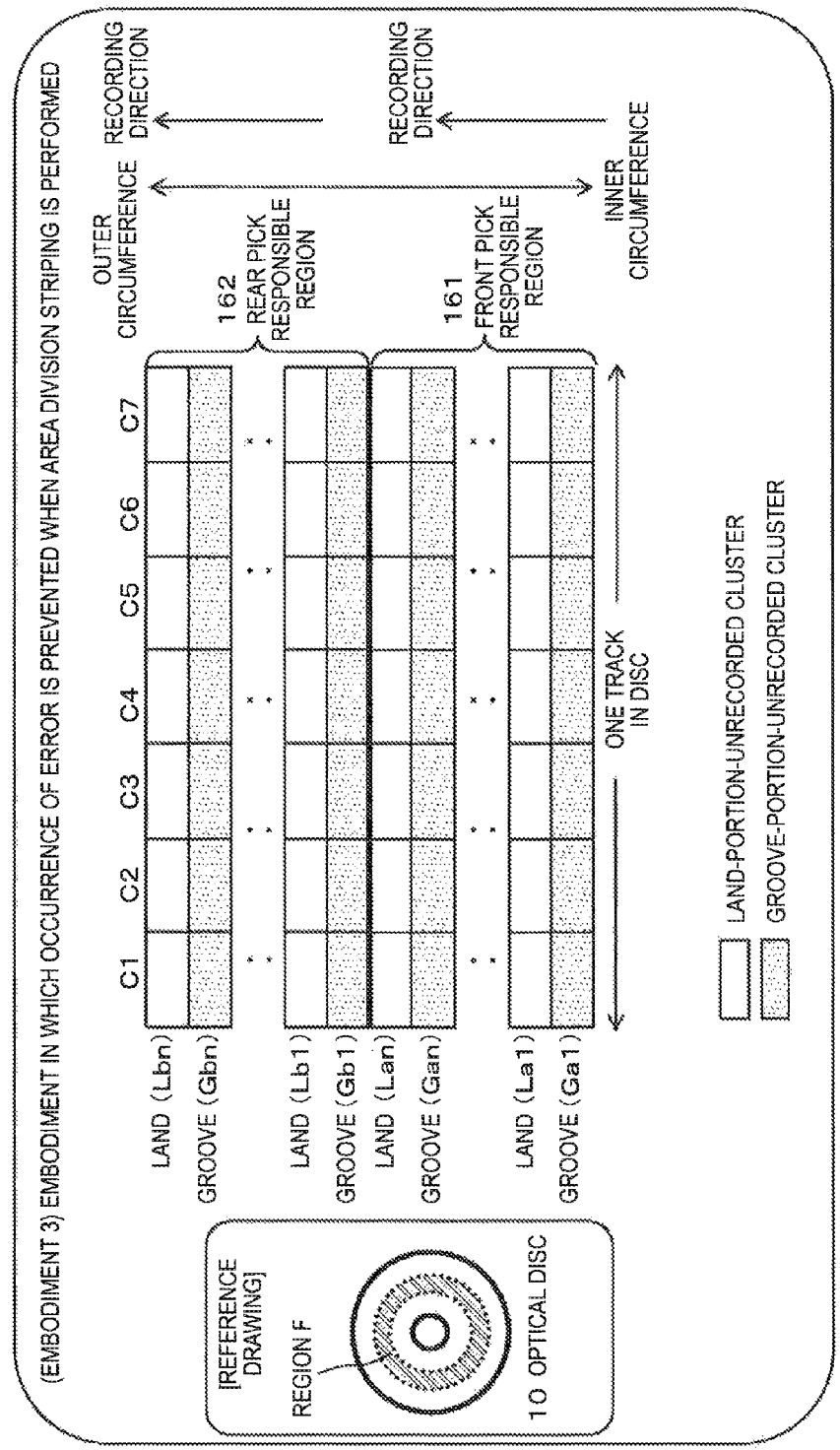
FIG. 22 is a diagram for describing an embodiment in which error occurrence is prevented when area division striping is performed.

A reference drawing in FIG. 22 illustrates a region F formed by a part of a user data region of the optical disc 10.

A region F in the reference drawing is a data region that includes a boundary between a front pick responsible region 161 in which data recording is performed using the front pickup 151 described with reference to FIG. 21 and a rear pick responsible region 162 in which data recording is performed using the rear pickup 152.

The drawing on the right side of FIG. 22 is a diagram illustrating a detailed configuration of the region F, that is, a land and groove configuration from the inner circumference side to the outer circumference side of the disc in the region F.

The front pick responsible region 161 in which the data recording is performed using the front pickup 151 and the rear pick responsible region 162 in which the data recording is performed using the rear pickup 152 are illustrated.

FIG. 22 illustrates a cluster configuration of the following data recording portions from the inner circumference side to the outer circumference side of the disc in the region F:

a groove (Ga1)/a land (La1) to a groove (Gan)/a land (Lan) of the front pick responsible region 161; and a groove (Gb1)/a land (Lb1) to a groove (Gbn)/a land (Lbn) of the rear pick responsible region 162.

One rectangular region corresponds to one cluster (64 KB).

The vertical direction is equivalent to a radial direction of the disc, the lower side is the inner circumference portion of the disc, and the upper side is the outer circumference portion of the disc. A left end to a right end is equivalent to one track in a disc.

A data recording process is performed individually in groove and land portions. In addition, a data recording direction is directed from the left to the right and is directed from the inner circumference side (the lower side) to the outer circumference side (the upper side).

Embodiment 3 is an embodiment when the area division striping which is a parallel recording process using a plurality of pickups is performed.

Also, a recording process sequence of the embodiment example to be described below is a process example in which recording of the lands (L) is antecedently performed and recording of the grooves (G) is subsequently performed. However, this is merely an example, and the process according to the present disclosure can also be applied as a process in which recording of the grooves (G) is antecedently performed and recording of the lands (L) is subsequently performed. The same error prevention effect can be obtained.

Three chronological process steps (steps S61 to S63) will be described in order with reference to FIGS. 23 to 25. Also, before step S61 is performed, both the lands and the grooves in the region F are assumed to be in a data-unrecorded state. That is, all the clusters that form the groove (Ga1) to the land (Lbn) illustrated in FIG. 22 are assumed to be configured as land-portion-unrecorded clusters and groove-portion-unrecorded clusters.

Figure 23:
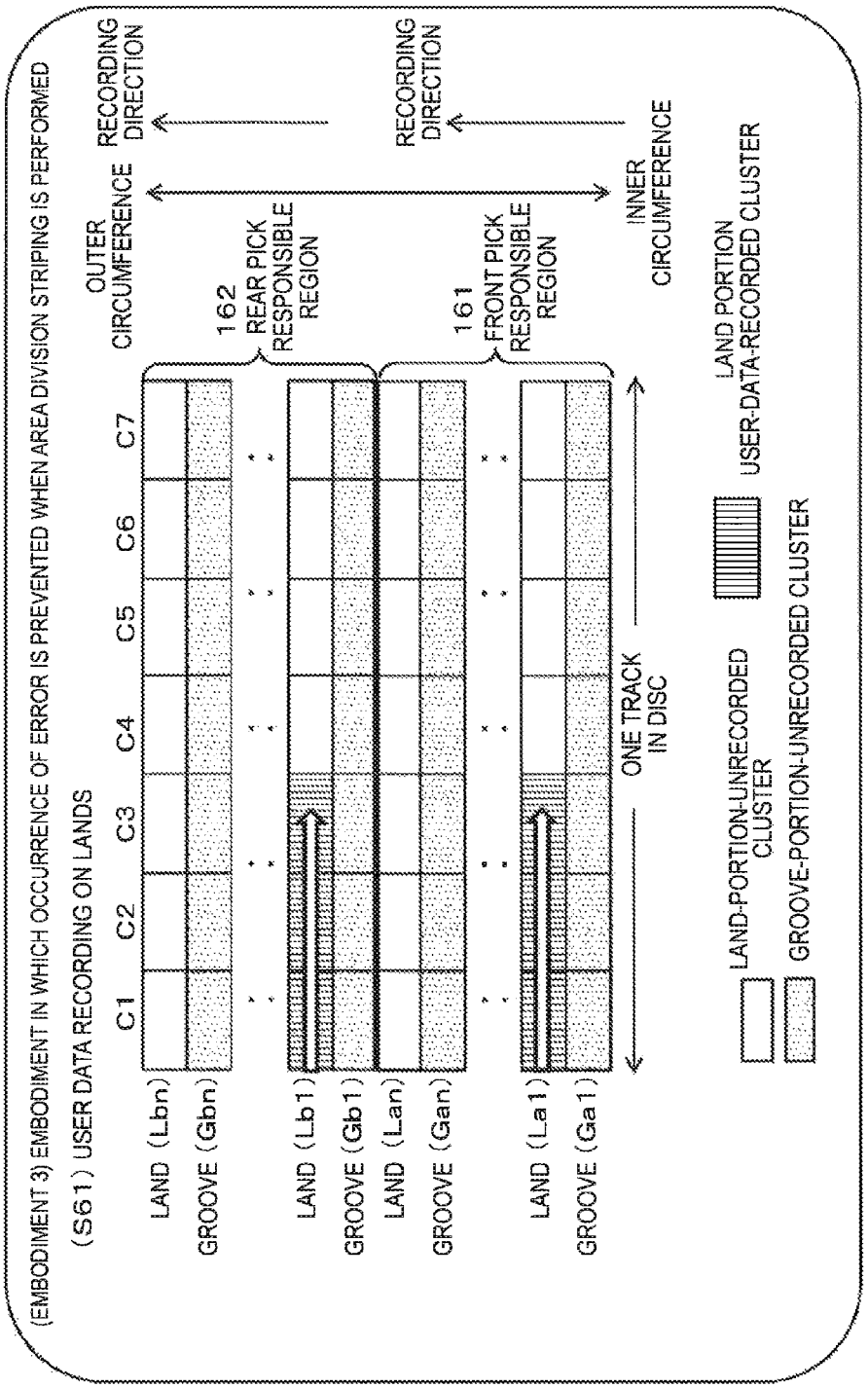
FIG. 23 is a diagram for describing an embodiment in which error occurrence is prevented when area division striping is performed.

The following three chronological process steps (steps S61 to S63) will be described in order with reference to FIGS. 23 to 25:

(Step S61) data recording on lands (FIG. 23)

(Step S62) standing by for data recording on the groove (Gb1) adjacent to the front pick responsible region 161 in the rear pick responsible region 162

Figure 24:
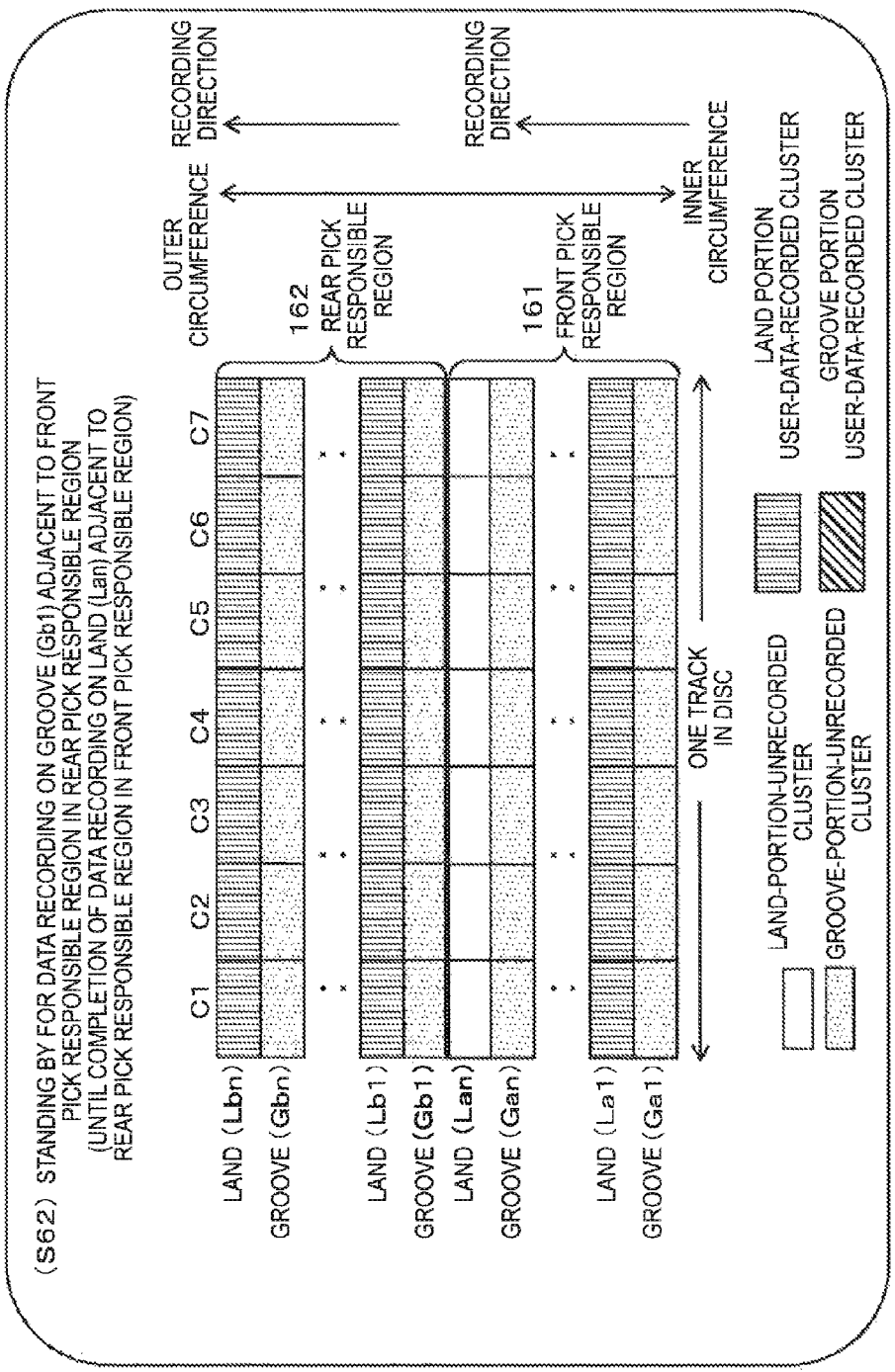
FIG. 24 is a diagram for describing an embodiment in which error occurrence is prevented when area division striping is performed.

(until completion of data recording on the land (Lan) adjacent to the rear 26 pick responsible region 162 in the front pick responsible region 161) (FIG. 24)

Figure 25:
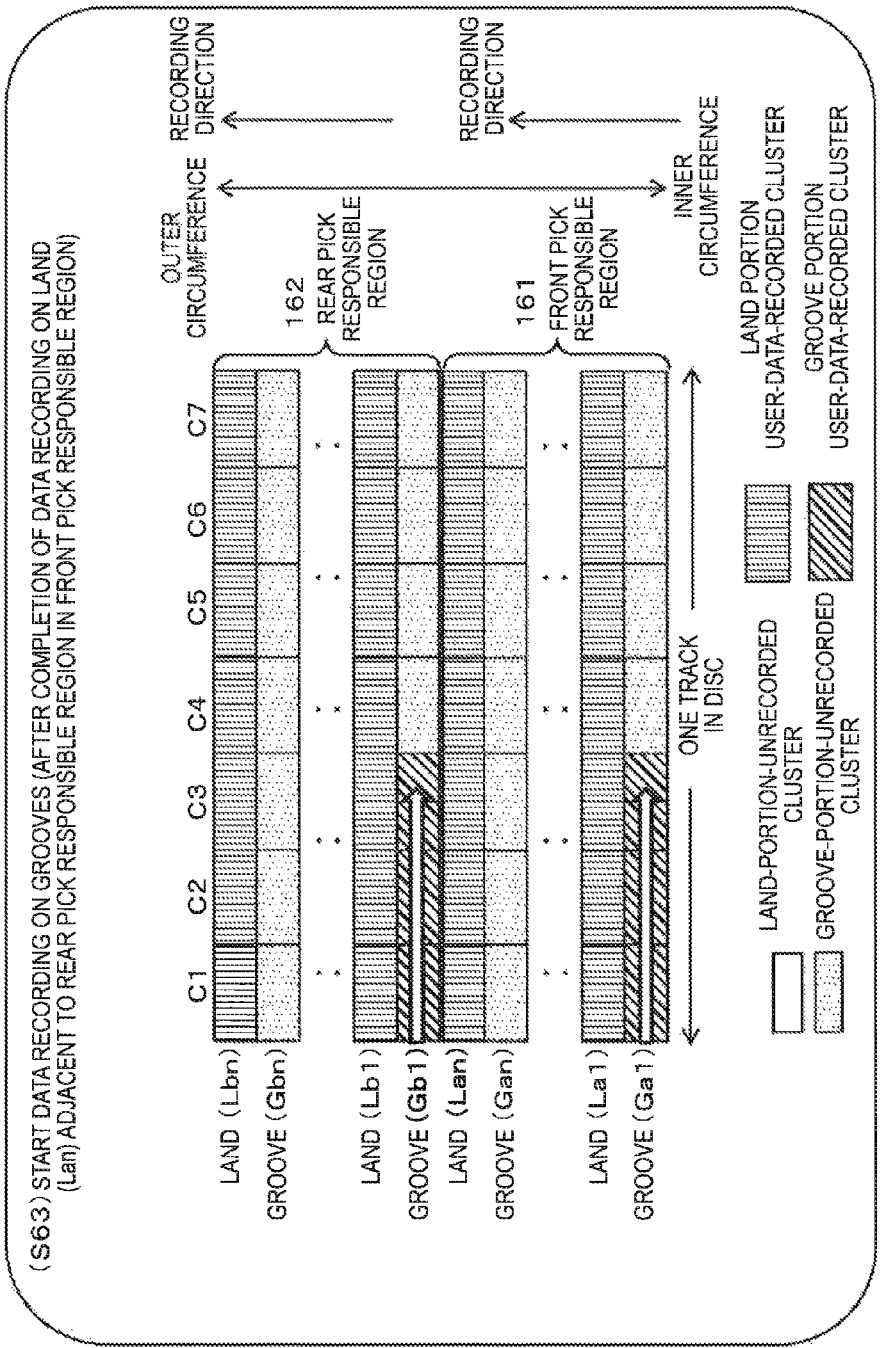
FIG. 25 is a diagram for describing an embodiment in which error occurrence is prevented when area division striping is performed.

(Step S63) start of data recording on the grooves (after completion of data recording on the land (Lan) adjacent to the rear pick responsible region in the front pick responsible region) (FIG. 25)

(Step S61) data recording on lands

First, a data recording process on the lands will be described with reference to FIG. 23.

In the embodiment, the area division striping which is the parallel recording process using the plurality of pickups is performed.

In the example illustrated in FIG. 23, data recording is performed in parallel on the front pick responsible region 161 and the rear pick responsible region 161 using two picks in parallel.

First, as illustrated in FIG. 23, data is recorded in a direction indicated by arrows extending from the land (La1) of the front pick responsible region 161 and the land (Lb1) of the rear pick responsible region 162.

In the front pick responsible region 161, data recording from the land (La1) to the land (Lan) of the front pick responsible region 161 is performed using the front pickups.

On the other hand, in the rear pick responsible region 162, data recording from the land (Lb1) to the land (Lbn) of the rear pick responsible region 162 is performed using the rear pickups.

When user data is recorded on the lands (La1 to Lan) of the front pick responsible region 161 and the lands (Lb1 to Lbn) of the rear pick responsible region 162, the grooves on both sides of the land in which the user data is recorded are all in the data-unrecorded state and the user data can be recorded through a correct tracking process.

(Step S62) standing by for data recording on the groove (Gb1) adjacent to the front pick responsible region 161 in the rear pick responsible region 162

(until completion of data recording on the land (Lan) adjacent to the rear pick responsible region 162 in the front pick responsible region 161)

Next, a process of step S62 will be described with reference to FIG. 24.

Step S62 is a process of standing by for start of data recording from the groove (Gb1) in the rear pick responsible region 162.

After the data recording to the lands (Lb1 to Lbn) in the rear pick responsible region 162 ends, the data recording from the groove (Gb1) starts in the rear pick responsible region 162. The start process timing is set after data recording completion on the land (Lan) adjacent to the rear pick responsible region 162 in the front pick responsible region 161.

(Step S63)

After the standby process in step S62, the process of step S63 illustrated in FIG. 25 is performed.

The process of step S63 is a process of starting data recording on the grooves after the data recording completion on the land (Lan) adjacent to the rear pick responsible region in the front pick responsible region.

As illustrated in FIG. 25, in the front pick responsible region 161, the data recording from the groove (Ga1) to the groove (Gan) of the front pick responsible region 161 is performed using the front pickups.

On the other hand, in the rear pick responsible region 162, the data recording from the groove (Gb1) to the groove (Gbn) of the rear pick responsible region 162 is performed using the rear pickups.

When the user data is recorded on the grooves (Ga1 to Gan) of the front pick responsible region 161 and the grooves (Gb1 to Gbn) of the rear pick responsible region 162, the lands on both sides of the groove in which the user data are all in the data-recorded state and the user data can be recorded in the correct tracking process.

That is, the lands on both sides of the clusters of the groove in which the user data is recorded are all configured by the clusters in which the recording of the user data is finished.

On the groove interposed by the lands in a state in which the states of both sides are the same data-recorded state, that is, the data-recorded state, the correct tracking process is possible, as described above with reference to FIG. 3 and the user data can correctly be recorded without occurrence of a writing error.

As described above, the process of recording the user data on the lands and the grooves when the area division striping which is the parallel recording process to which the plurality of pickups are applied is performed can be performed through the processes of steps S61 to S63 in FIGS. 23 to 25 without occurrence of an error.

3. Management Information

An example of management information necessary when the data recording process according to each of the foregoing embodiments is performed will be described with reference to FIG. 26 and the subsequent drawings.

As described above with reference to FIG. 3, normal data recording is possible when data recording states of the lands on both side of a groove are the same in the data recording on the groove, that is, when the land on both sides is in a state in which the data recording is finished or the land on both sides is in a data-unrecorded state.

However, when the data recording states of the lands on both sides are different, that is, when one of the lands on both sides is in a state in which the data recording is finished and the other land is in a data-unrecorded state, the normal data recording is not performed and a recording error occurs.

One cause for such recording errors is considered to be that a minute difference occurs in reflected light from lands on both sides of a groove of a data recording region and tracking is not accurately performed.

The occurrence of the error is the same even in the data recording process on a land.

That is, normal data recording is possible when data recording states of grooves on both sides of a land are the same in the data recording on the land, that is, when the grooves on both sides are in a state in which the data recording is finished or the grooves on both sides are in a data-unrecorded state.

However, when the data recording states of the grooves on both sides are different, that is, one of the grooves on both sides is in a state in which the data recording is finished and the other groove is in a data-unrecorded state, the normal data recording is not performed and a recording error occurs.

To accurately perform the processes of the above-described Embodiments 1 to 3, it is necessary to comprehend which regions of the lands and the grooves on the disc are in the data-recorded state or in an unrecorded state and the position of an unrecorded defect cluster in advance.

An example of the management information for this purpose will be described with reference to FIGS. 26 and 27.

Figure 26:
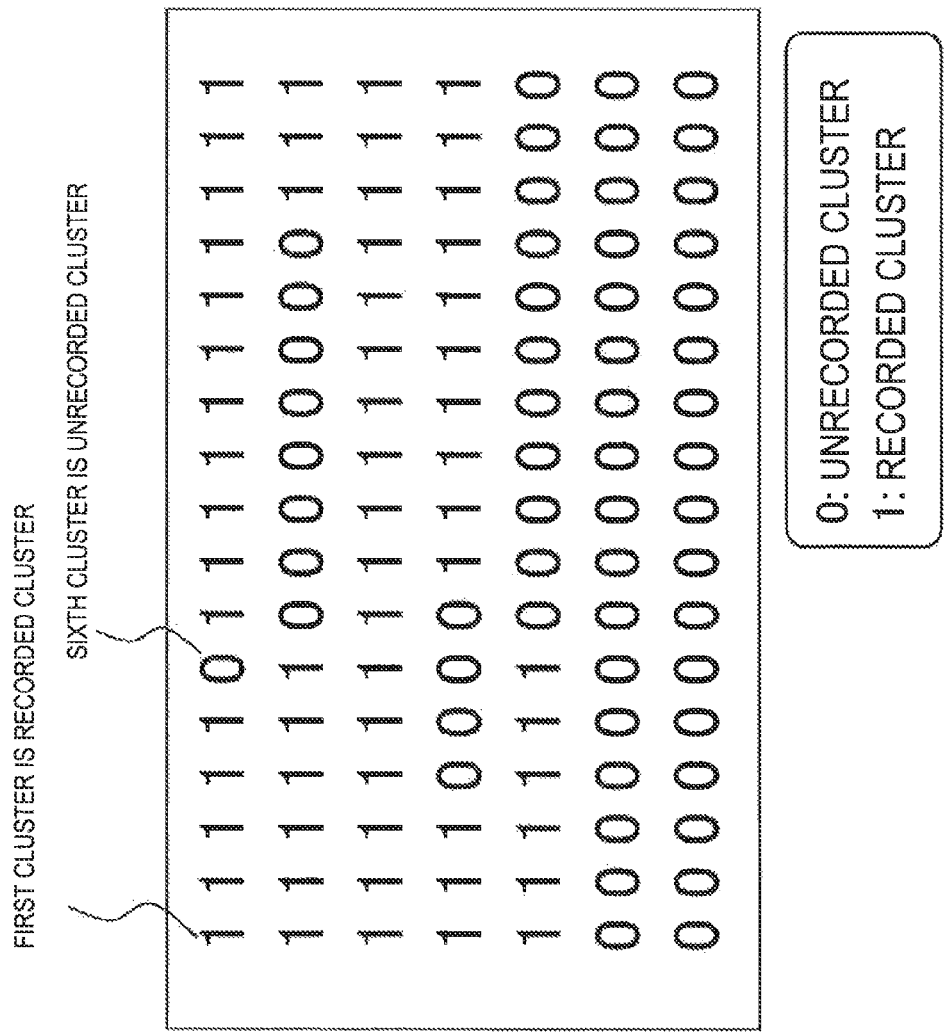
FIG. 26 is a diagram for describing an example of management information.

FIG. 26 illustrates an example of a recording bitmap.

The recording bit map is a bitmap for identifying whether clusters are data-recorded clusters or data-unrecorded clusters in units of clusters.

In the record bitmap, for example, [1] is set when a cluster is a data-recorded cluster, and [0] is set when a cluster is a data-unrecorded cluster.

In data illustrated in FIG. 26, a top left end is a first cluster on the disc and recorded or unrecorded information is subsequently recorded after second and third clusters toward the right side and the bottom side.

In the example of the drawing, first cluster correspondence data is [1] and a first cluster is a data-recorded cluster. A sixth cluster is [0] and is identified as an unrecorded cluster.

An information processing device performing the data recording process using the recording bitmap can comprehend a data recording state in units of clusters.

However, the recording bitmap has a problem that the amount of data increases.

FIG. 27 is a diagram illustrating an example of management information which can be used as alternative means of the recording bitmap illustrated in FIG. 26.

(1) of FIG. 27 is defect region information (dEFECT LIST (DFL)) in which sector numbers of defect sectors are recorded. A sector (2 KB) is a constituent element of a cluster (64 KB).

In the defect region information indicated in (1) of FIG. 27, sector numbers of defect sectors in which data is unrecordable or no longer unrecordable are recorded. Further, "recorded/unrecorded information" indicating whether each of the defect sectors is in a data-recorded state is recorded in association with each defect sector.

(2) of FIG. 27 is a data recording state of each cluster, specifically, data recorded sector information in the cluster indicating in which sector data recording is finished from a head of each cluster, that is, management information indicating last record position information of the SRR (last record address (LRA)).

The data recording state of the cluster can be ascertained in detail with reference to the management information indicated in (1) and (2) of FIG. 27, and thus the processes of the above-described Embodiments 1 to 3 can reliably be performed. Also, the management information is recorded in a management information recording region of an inner zone or an outer zone of the disc and is updated in series with a change in the data recording state.

4. Example Configuration of Information Processing Device

Figure 28:
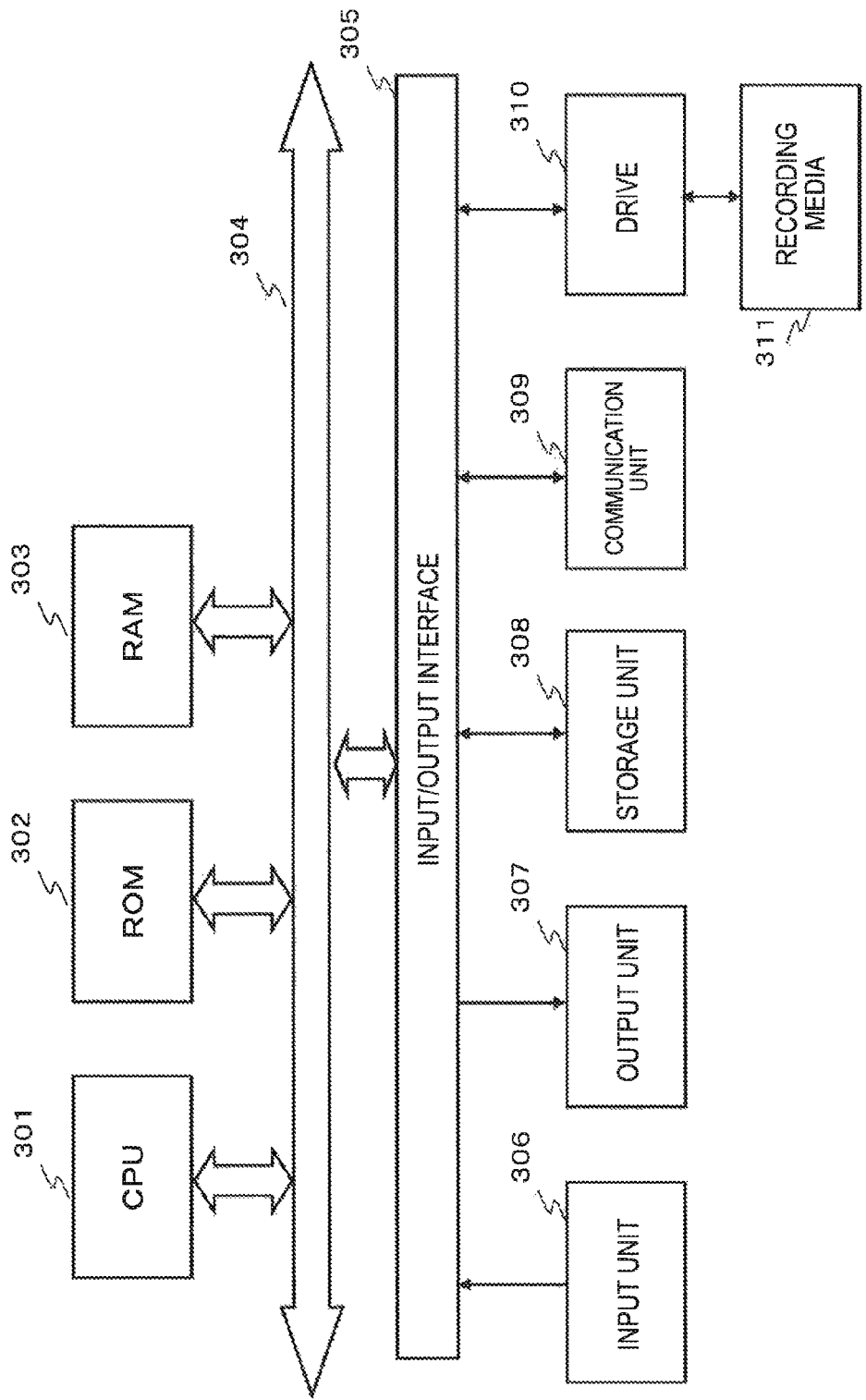
FIG. 28 is a diagram for describing an example of a hardware configuration of an information processing device.

Next, with reference to FIG. 28, an example configuration of an information processing device that executes each of the above-described processing will be described.

A central processing unit (CPU) 301 functions as a data processing unit that executes various processes according to a program stored in read-only memory (ROM) 302 or a storage unit 308. For example, processes described in the embodiment described above are executed. Random access memory (RAM) 303 stores information such as programs executed by the CPU 301, and data. The CPU 301, ROM 302, and RAM 303 are interconnected by a bus 304.

The CPU 301 is connected to an input/output interface 305 via the bus 304. Connected to the input/output interface 305 are an input unit 306, which includes devices such as various switches, a keyboard, a mouse, and a microphone, and an output unit 307, which includes devices such as a display and one or more speakers. The CPU 301 executes various processes in response to commands input from the input unit 306, and outputs processing results to the output unit 307, for example.

A storage unit 308 connected to the input/output interface 305 includes a hard disk or the like, for example, and stores programs executed by the CPU 301 and various data. A communication unit 309 functions as a transceiving unit for data communication via a network such as the Internet or a local area network, additionally functions as a transceiving unit for broadcast waves, and communicates with external devices.

The drive 310 connected to the input/output interface 305 drives a recording media 311 such as a disc on which data recording is performed according to the above-described embodiments to write or read data.

5. Summary of Configuration Present Disclosure

The foregoing thus provides a detailed explanation of embodiments of the present disclosure with reference to specific embodiments. However, it is obvious that persons skilled in the art may make modifications and substitutions to these embodiments without departing from the gist of the present disclosure. In other words, the present disclosure has been disclosed by way of example, and should not be interpreted in a limited manner. The gist of the present disclosure should be determined in consideration of the claims.

Additionally, the present technology may also be configured as below.

(1)

An information processing device including:

a data processing unit configured to control a data recording process on both lands and grooves of an optical disc, in which, when data is recorded on the lands or the grooves, the data processing unit performs a process of detecting positions at which data recording states of grooves or lands on both sides adjacent to a data recording target land or groove match with each other, or the data processing unit performs a process of matching data recording states of grooves or lands on both sides adjacent to a data recording target land or groove with each other.

(2)

The information processing device according to (1), in which the data processing unit performs a dummy data recording process as the process of matching the data recording states of the grooves or the lands on both sides adjacent to the data recording target land or groove with each other.

(3)

The information processing device according to (2), in which the data processing unit records dummy data equivalent to one track in the disc before a sequential recording range (SRR) when data recording starts from an SRR boundary.

(4)

The information processing device according to (2), in which the data processing unit records dummy data equivalent to one track in the disc before a user data region start position when data recording starts from the user data region start position.

(5)

The information processing device according to (4), in which the user data region start position is a user data region start position in a second or more layer in the optical disc including a plurality of recording layers.

(6)

The information processing device according to (2), in which the data processing unit records dummy data equivalent to one track in the disc before a spare region start position when data recording starts from the spare region start position.

(7)

The information processing device according to (2), in which the data processing unit records dummy data equivalent to one track in the disc before a defect cluster region skip destination when data recording starts from the defect cluster region skip destination.

(8)

The information processing device according to (1), in which the data processing unit performs the process of matching the data recording states of the grooves or the lands on both sides adjacent to the data recording target land or groove by skipping a recording process on an adjacent cluster of a defect cluster.

(9)

The information processing device according to (1), in which, when a plurality of pickups are applied in parallel and area division striping is performed to record data in parallel, the data processing unit performs the process of matching the data recording states of the grooves or the lands on both sides adjacent to the data recording target land or groove by awaiting completion of a data recording process by one pickup on a boundary region of divided regions and then recording data in the boundary region of the divided regions by the other pickup.

(10)

The information processing device according to any of (1) to (9), in which, as management information of the data recording states of the optical disc, the data processing unit is configured to use defect region information (defect list (DFL)) in which an identifier of a defect region is recorded, and last data recording position information in each cluster.

(11)

An information recording medium capable of recording data on both lands and grooves, the information recording medium being configured to record defect region information (defect list (DFL)) in which an identifier of a defection region is recorded and last data recording position information in each cluster, as management information of a data recording state.

(12)

An information processing method of controlling data recording on an optical disc in an information processing device, in which the information processing device includes a data processing unit that controls a data recording process on both lands and grooves of the optical disc, and when data is recorded on the lands or the grooves, the data processing unit performs a process of detecting positions at which data recording states of grooves or lands on both sides adjacent to a data recording target land or groove match with each other, or the data processing unit performs a process of matching data recording states of grooves or lands on both sides adjacent to a data recording target land or groove with each other.

(13)

A program causing an information processing device to control data recording on an optical disc, in which the information processing device includes a data processing unit that controls a data recording process on both lands and grooves of the optical disc, and when data is recorded on the lands or the grooves, the program causes the data processing unit to perform a process of detecting positions at which data recording states of grooves or lands on both sides adjacent to a data recording target land or groove match with each other, or to perform a process of matching data recording states of grooves or lands on both sides adjacent to a data recording target land or groove with each other.

In addition, it is possible to execute the processes described in this specification in hardware, in software, or in a compound configuration of both. In the case of executing processes in software, a program stating a processing sequence may be installed onto memory in a computer built into special-purpose hardware and executed, or alternatively, the program may be installed and executed on a general-purpose computer capable of executing various processes. For example, the program may be prerecorded onto a recording medium. Besides installing the program onto a computer from a recording medium, the program may also be received via a network such as a local area network (LAN) or the Internet, and installed onto a built-in recording medium such as a hard disk.

Note that the various processes described in the specification not only may be executed in a time series in the order described, but may also be executed in parallel or individually according to the processing performance of the device executing the process, or as needed. Also, in this specification, the term "system" refers to a logical aggregate configuration of multiple devices, and the respective devices of the configuration are not limited to being inside the same housing.

INDUSTRIAL APPLICABILITY

As described above, according to the configuration of one embodiment of the present disclosure, a configuration for preventing a recording error when a data recording process is performed on both lands and grooves of an optical disc is realized.

Specifically, an information processing device includes a data processing unit configured to control a data recording process on both lands and grooves of an optical disc. The data processing unit performs a process of detecting or matching positions at which data recording states of grooves or lands on both sides adjacent to a data recording target land or groove match when data are recorded on the lands or the grooves. The data processing unit performs, for example, a dummy data recording process or a skipping process as the process of matching the data recording states of the grooves or the lands on both sides adjacent to the data recording target land or groove.

In this configuration, the configuration for preventing a recording error when a data recording process is performed on both lands and grooves of an optical disc is realized.

REFERENCE SIGNS LIST 10 optical disc
11 land
12 groove
31 SRR boundary
32 dummy data
33 user data
34 user data
51 user data region start position
52 dummy data
53 user data
54 user data
71 spare region start position
72 dummy data
73 user data
74 user data
91 defect cluster region skip destination
92 dummy data
93 user data
94 user data
101 defect cluster
102 skip target cluster
103 user data
104 user data
151 front pickup
161 front pick responsible region
162 rear pick responsible region
301 CPU
302 ROM
303 RAM
304 BUS
305 input/output interface
306 input unit
307 output unit
308 storage unit
309 communication unit
310 drive
311 recording media

The invention claimed is:

1. An information processing device comprising:
a data processing unit configured to control a data recording process on both lands and grooves of an optical disc,
wherein, when data is recorded on the lands or the grooves, the data processing unit performs a process of detecting positions at which data recording states of grooves or lands on both sides adjacent to a data recording target land or groove match with each other, or the data processing unit performs a process of matching data recording states of grooves or lands on both sides adjacent to a data recording target land or groove with each other.

2. The information processing device according to claim 1,
wherein the data processing unit performs a dummy data recording process as the process of matching the data recording states of the grooves or the lands on both sides adjacent to the data recording target land or groove with each other.

3. The information processing device according to claim 2,
wherein the data processing unit records dummy data equivalent to one track in the disc before a sequential recording range (SRR) when data recording starts from an SRR boundary.

4. The information processing device according to claim 2,
wherein the data processing unit records dummy data equivalent to one track in the disc before a user data region start position when data recording starts from the user data region start position.

5. The information processing device according to claim 4,
wherein the user data region start position is a user data region start position in a second or more layer in the optical disc including a plurality of recording layers.

6. The information processing device according to claim 2,
wherein the data processing unit records dummy data equivalent to one track in the disc before a spare region start position when data recording starts from the spare region start position.

7. The information processing device according to claim 2,
wherein the data processing unit records dummy data equivalent to one track in the disc before a defect cluster region skip destination when data recording starts from the defect cluster region skip destination.

8. The information processing device according to claim 1,
wherein the data processing unit performs the process of matching the data recording states of the grooves or the lands on both sides adjacent to the data recording target land or groove by skipping a recording process on an adjacent cluster of a defect cluster.

9. The information processing device according to claim 1,
wherein, when a plurality of pickups are applied in parallel and area division striping is performed to record data in parallel, the data processing unit performs the process of matching the data recording states of the grooves or the lands on both sides adjacent to the data recording target land or groove by awaiting completion of a data recording process by one pickup on a boundary region of divided regions and then recording data in the boundary region of the divided regions by the other pickup.

10. The information processing device according to claim 1,
wherein, as management information of the data recording states of the optical disc, the data processing unit is configured to use
defect region information (defect list (DFL)) in which an identifier of a defect region is recorded, and
last data recording position information in each cluster.

11. A non-transitory computer-readable storage medium having embodied thereon a program, which when executed by a computer causes the computer to execute a method, the method comprising:
controlling a data recording process on both lands and grooves of an optical disc;
when data is recorded on the lands or the grooves,
detecting positions at which data recording states of grooves or lands on both sides adjacent to a data recording target land or groove match with each other, or
matching data recording states of grooves or lands on both sides adjacent to a data recording target land or groove with each other;
recording defect region information (defect list (DFL)) in which an identifier of a defection region is recorded; and
recording last data recording position information in each cluster, as management information of a data recording state.

12. An information processing method performed by an information processing device having a processor, the method comprising:
controlling a data recording process on both lands and grooves of an optical disc; and
when data is recorded on the lands or the grooves,
detecting positions at which data recording states of grooves or lands on both sides adjacent to a data recording target land or groove match with each other, or
matching data recording states of grooves or lands on both sides adjacent to a data recording target land or groove with each other.

13. A non-transitory computer-readable medium having embodied thereon a program, which when executed by a computer causes the computer to execute a method, the method comprising:
controlling a data recording process on both lands and grooves of an optical disc; and
when data is recorded on the lands or the grooves,
detecting positions at which data recording states of grooves or lands on both sides adjacent to a data recording target land or groove match with each other, or
matching data recording states of grooves or lands on both sides adjacent to a data recording target land or groove with each other.

* * * * *